United States Patent
Toshioka et al.

(10) Patent No.: US 6,901,750 B2
(45) Date of Patent: Jun. 7, 2005

(54) EXHAUST EMISSION CONTROL APPARATUS AND METHOD FOR INTERNAL COMBUSTION ENGINE

(75) Inventors: Shunsuke Toshioka, Numazu (JP); Shinya Hirota, Susono (JP); Yoshimitsu Henda, Numazu (JP); Kazuhiro Itoh, Mishima (JP); Takamitsu Asanuma, Susono (JP); Koichi Kimura, Nagoya (JP); Yasuaki Nakano, Sunto-gun (JP); Koichiro Nakatani, Mishima (JP); Akira Mikami, Susono (JP); Takanori Ueda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/645,621

(22) Filed: Aug. 22, 2003

(65) Prior Publication Data

US 2004/0040291 A1 Mar. 4, 2004

(30) Foreign Application Priority Data

Aug. 30, 2002 (JP) ........................................ 2002-255403

(51) Int. Cl.⁷ ................................................ F01N 3/00
(52) U.S. Cl. ............................ 60/295; 60/285; 60/288; 60/292; 60/297; 60/301
(58) Field of Search .......................... 60/276, 285, 286, 60/287, 288, 289, 295, 297, 300, 301, 324, 292

(56) References Cited

U.S. PATENT DOCUMENTS

| 5,473,890 A | * | 12/1995 | Takeshima et al. | ............ 60/285 |
| 5,832,722 A | * | 11/1998 | Cullen et al. | .................. 60/274 |
| 6,014,859 A | * | 1/2000 | Yoshizaki et al. | ............. 60/285 |
| 6,058,700 A | * | 5/2000 | Yamashita et al. | ............. 60/285 |
| 6,212,885 B1 | * | 4/2001 | Hirota et al. | .................. 60/288 |
| 6,233,925 B1 | * | 5/2001 | Hirota et al. | .................. 60/285 |

FOREIGN PATENT DOCUMENTS

| JP | A 11-247650 | 9/1999 |
| JP | A 2000-145436 | 5/2000 |
| JP | A 2000-161045 | 6/2000 |

* cited by examiner

Primary Examiner—Binh Q. Tran
(74) Attorney, Agent, or Firm—Oliff & Berridge, PLC

(57) ABSTRACT

Exhaust emission control apparatus and method for an internal combustion engine maintain a small amount of sulfur components contained in exhaust gas flowing out of a sulfur component retainer agent even if the amount of sulfur components retained by the agent becomes great. The exhaust emission control apparatus includes a NOx retainer agent and the sulfur component retainer agent. The apparatus performs a NOx releasing process of adjusting the air-fuel ratio of exhaust gas flowing into the sulfur component retainer agent so that the air-fuel ratio of exhaust gas flowing into the NOx retainer agent becomes substantially stoichiometric or rich of stoichiometry if NOx retained by the NOx retainer agent is to be released. The apparatus prohibits the air-fuel ratio of exhaust gas flowing into the sulfur component retainer agent from becoming substantially stoichiometric or rich of stoichiometry if the amount of the sulfur components retained by the agent is at least a first predetermined amount.

29 Claims, 9 Drawing Sheets

EXHAUST EMISSION CONTROL APPARATUS AND METHOD FOR INTERNAL COMBUSTION ENGINE

INCORPORATION BY REFERENCE

The disclosure of Japanese Patent Application No. 2002-255403 filed on Aug. 30, 2002, including the specification, drawings and abstract is incorporated herein by reference in its entirety.

BACKGROUND OF THE INVENTION

1. Field of the Invention

The invention relates to an apparatus and a method for controlling exhaust emission of an internal combustion engine.

2. Description of the Related Art

There are known technologies related to an exhaust emission control apparatus in which a NOx catalyst (NOx retainer agent) capable of absorbing NOx from incoming exhaust gas is provided, and a SOx catalyst (sulfur component retainer agent) capable of absorbing SOx contained in incoming exhaust gas is disposed upstream of the NOx catalyst. In such an exhaust emission control apparatus, the provision of the SOx catalyst upstream of the NOx catalyst prevents the sulfur poisoning of the NOx catalyst caused by inflow of SOx into the NOx catalyst.

However, the SOx catalyst used in the aforementioned related-art exhaust emission control apparatus is not capable of infinitely taking up and retaining SOx from incoming exhaust gas, but has a limit to the amount of SOx retainable. Generally, as the amount of SOx retained by the SOx catalyst increases, it becomes more difficult for the SOx catalyst to capture and retain SOx contained in incoming exhaust gas; therefore, there is a tendency toward an increased amount of SOx contained in exhaust gas flowing out of the SOx retainer agent. Such an increase in the amount of SOx contained in exhaust gas flowing out of the SOx retainer agent will result in the sulfur poisoning of the NOx retainer agent in the aforementioned related-art exhaust emission control apparatus. Hence, the amount of SOx contained in exhaust gas flowing out of the SOx retainer agent needs to be small even if the amount of SOx retained in the SOx retainer agent becomes great.

SUMMARY OF THE INVENTION

According to one aspect of the invention, an exhaust emission control apparatus for an internal combustion engine is provided.

The exhaust emission control apparatus includes an exhaust passage, a NOx retainer agent, and a sulfur component retainer agent. The NOx retainer agent is provided in the exhaust passage. The NOx retainer agent takes up and retains NOx from an incoming exhaust gas if an air-fuel ratio of the incoming exhaust gas is lean of stoichiometry, and releases NOx retained by the agent if the air-fuel ratio of the incoming exhaust gas is substantially stoichiometric or rich of stoichiometry. The sulfur component retainer agent is provided in the exhaust passage upstream of the NOx retainer agent, and takes up and retains a sulfur component contained in an incoming exhaust gas. The apparatus performs a NOx releasing process of adjusting the air-fuel ratio of an exhaust gas flowing into the sulfur component retainer agent so that the air-fuel ratio of an exhaust gas flowing into the NOx retainer agent becomes substantially stoichiometric or rich of stoichiometry if NOx retained by the NOx retainer agent is to be released. The apparatus prohibits the air-fuel ratio of the exhaust gas flowing into the sulfur component retainer agent from becoming substantially stoichiometric or rich of stoichiometry if an amount of the sulfur component retained by the sulfur component retainer agent is at least a first predetermined amount.

According to another aspect of the invention, an exhaust emission control method for an internal combustion engine is provided. The exhaust emission control method includes the steps of causing an exhaust gas to flow into an exhaust passage; causing a sulfur component retainer agent provided in the exhaust passage to capture and retain a sulfur component contained in an incoming exhaust gas; and causing a NOx retainer agent provided in the exhaust passage downstream of the sulfur component retainer agent to capture and retain NOx from an incoming exhaust gas if an air-fuel ratio of the incoming exhaust gas is lean of stoichiometry, and causing the NOx retainer agent to release NOx retained by the NOx retainer agent if the air-fuel ratio of the incoming exhaust gas is substantially stoichiometric or rich of stoichiometry. In the exhaust emission control method, if NOx retained by the NOx retainer agent is to be released, a NOx releasing process is performed in which the air-fuel ratio of an exhaust gas flowing into the NOx retainer agent is adjusted so that the air-fuel ratio of the exhaust gas becomes substantially stoichiometric or rich of stoichiometry. If an amount of the sulfur component retained by the sulfur component retainer agent is at least a first predetermined amount, the air-fuel ratio of an exhaust gas flowing into the sulfur component retainer agent is prohibited from becoming substantially stoichiometric or rich of stoichiometry.

According to the above-described exhaust emission control apparatus and the above-described exhaust emission control method for an internal combustion engine, if the amount of sulfur components retained by the sulfur component retainer agent is greater than or equal to the predetermined amount, the air-fuel ratio of exhaust gas flowing into the sulfur component retainer agent is prohibited from becoming substantially stoichiometric or rich of stoichiometry. In particular, if the amount of sulfur components retained by the sulfur component retainer agent is greater than or equal to the predetermined amount, the NOx releasing process of shifting the air-fuel ratio of exhaust gas flowing into the sulfur component retainer agent to a substantially stoichiometric or rich air-fuel ratio is avoided even when NOx retained by the NOx retainer agent should be released. Thus, the air-fuel ratio of exhaust gas flowing into the sulfur component retainer agent is prohibited from becoming substantially stoichiometric or rich of stoichiometry if inflow of exhaust gas having a substantially stoichiometric or rich air-fuel ratio into the sulfur component retainer agent would result in an increased amount of sulfur components contained in exhaust gas flowing out of the sulfur component retainer agent; more specifically, if the amount of sulfur components retained by the sulfur component retainer agent exceeds the predetermined amount.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description and the accompanying drawings, the present invention will be described in more detail in terms of exemplary embodiments.

A first embodiment of the invention will be described below.

Figure 1:
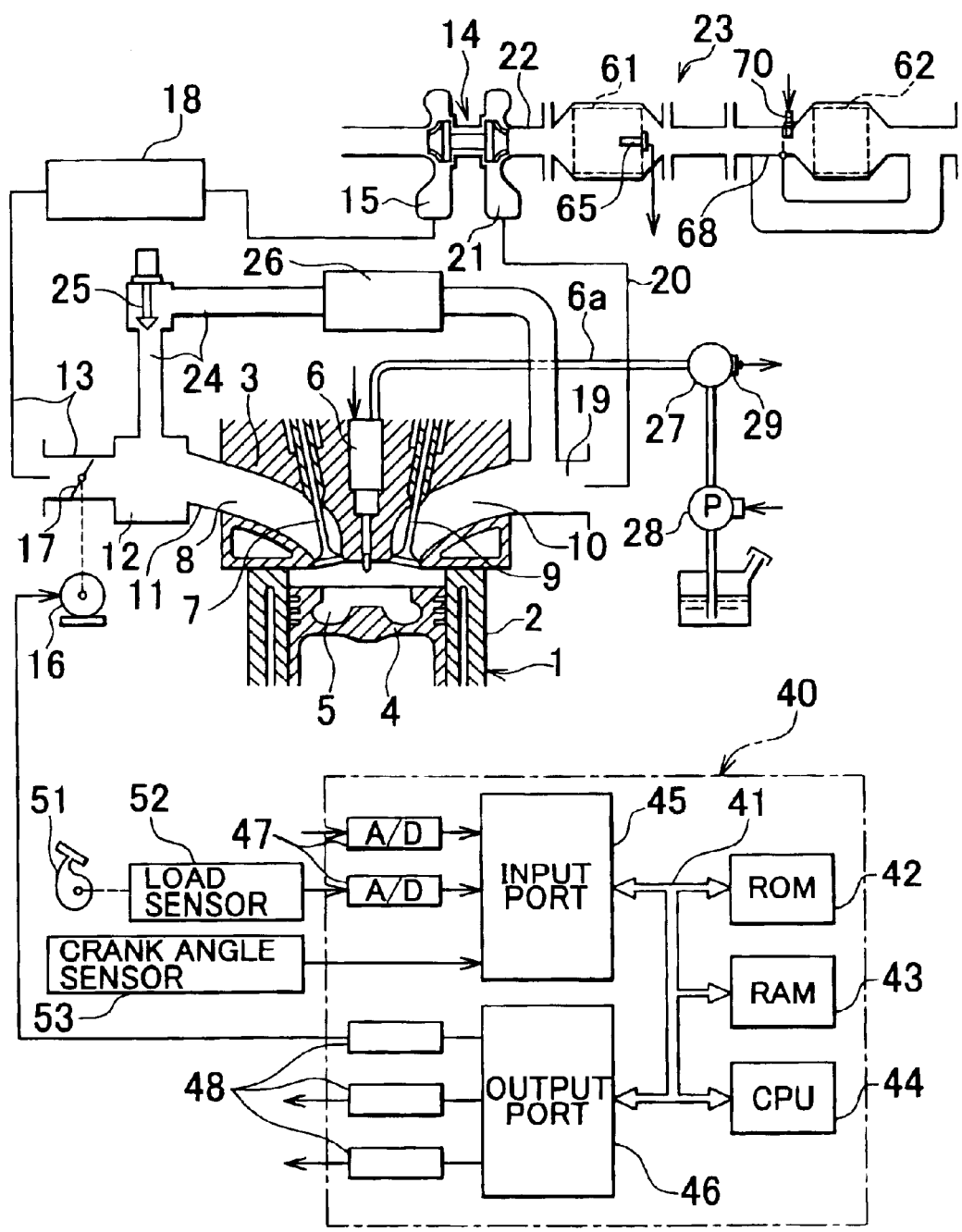
FIG. 1 is a diagram illustrating an overall construction of an internal combustion engine equipped with an exhaust emission control apparatus according to an embodiment of the invention.

FIG. 1 illustrates a direct injection type of compression self-ignition diesel internal combustion engine equipped with an exhaust emission control apparatus. An exhaust emission control apparatus according to the invention is also applicable to spark-ignition internal combustion engines.

Figure 2:
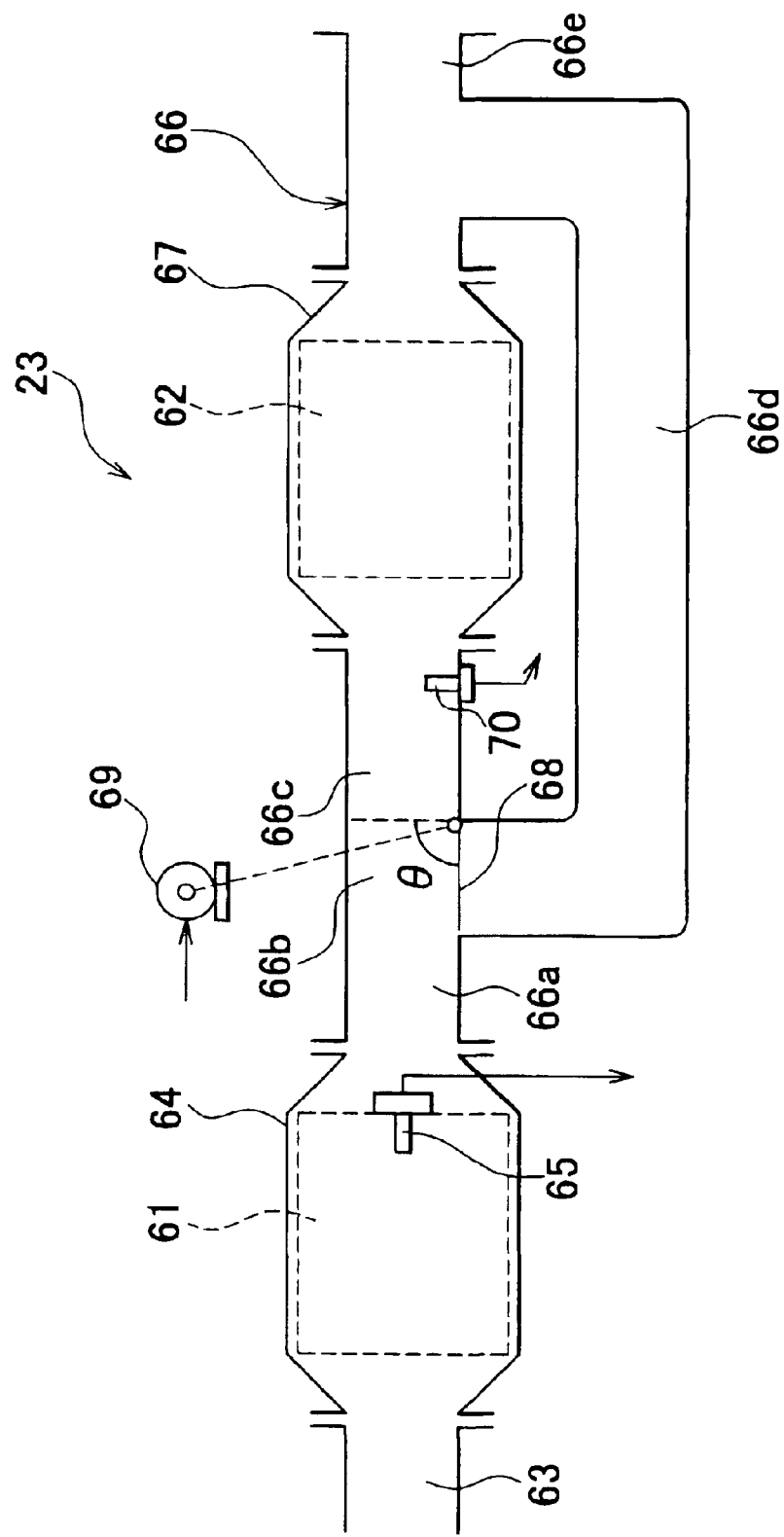
FIG. 2 illustrates an exhaust emission control apparatus according to a first embodiment of the invention.

FIGS. 1 and 2 show an engine 1, a cylinder block 2, a cylinder head 3, a piston 4, a combustion chamber 5, an electrically controlled fuel injection valve 6, an intake valve 7, an intake port 8, an exhaust valve 9, and an exhaust port 10. The intake port 8 is connected to a surge tank 12 via a corresponding intake branch pipe 11. The surge tank 12 is connected to a compressor 15 of an exhaust turbocharger 14 via an intake duct 13.

A throttle valve 17 is disposed in the intake duct 13, and is driven by a throttle valve-driving stepping motor 16. A cooling device 18 for cooling intake air that flows in the intake duct 13 is disposed around the intake duct 13. In the internal combustion engine shown in FIG. 1, engine-cooling water is led into the cooling device 18, thereby cooling intake air. The exhaust port 10 is connected to an exhaust turbine 21 of the exhaust turbocharger 14 via an exhaust manifold 19 and an exhaust pipe 20. An outlet opening of the exhaust turbine 21 is connected to an exhaust emission control apparatus 23 described in detail below, via an exhaust pipe 22.

The exhaust manifold 19 and the surge tank 12 are connected to each other via an exhaust gas recirculation (hereinafter, referred to as "EGR") passageway 24. An electrically controlled EGR control valve 25 is disposed in the EGR passageway 24. A cooling device 26 for cooling EGR gas that flows in the EGR passageway 24 is disposed around the EGR passageway 24. In the internal combustion engine shown in FIG. 1, engine-cooling water is conducted into the cooling device 26, thereby cooling EGR gas.

Each fuel injection valve 6 is connected to a common fuel reservoir, that is, a generally-termed common rail 27, via a fuel supply pipe 6a. The common rail 27 is supplied with fuel from an electrically controlled fuel pump 28 that is variable in the amount of fuel ejection. The fuel supplied into the common rail 27 is supplied to each fuel injection valve 6 via a corresponding fuel supply pipe 6a. The common rail 27 is provided with a fuel pressure sensor 29 for detecting the fuel pressure in the common rail 27. On the basis of an output signal of the fuel pressure sensor 29, the amount of fuel ejected from the fuel pump 28 is controlled so that the fuel pressure in the common rail 27 reaches a target fuel pressure.

A controller (which is an electronic control unit, and will hereinafter be referred to as "ECU") 40 is formed by a digital computer. The digital computer has a ROM (read-only memory) 42, a RAM (random access memory) 43, a CPU (microprocessor) 44, an input port 45, and an output port 46 which are interconnected via a bidirectional bus 41. An output signal of the fuel pressure sensor 29 is input to the input port 45 via a corresponding A/D converter 47.

An accelerator pedal 51 is connected to a load sensor 52 that generates an output voltage proportional to the amount of depression of the accelerator pedal 51. The output voltage of the load sensor 52 is input to the input port 45 via a corresponding A/D converter 47. Furthermore, a crank angle sensor 53 is connected to the input port 45. The crank angle sensor 53 generates an output pulse, for example, at every rotational angle of 30° of a crankshaft. The output port 46 is connected to each fuel injection valve 6, the throttle valve-driving stepping motor 16, the EGR control valve 25, and the fuel pump 28, via corresponding drive circuits 48.

Next, the construction of the exhaust emission control apparatus 23 according to the invention will be described with reference to FIG. 2. The exhaust emission control apparatus 23 has a sulfur component retainer agent 61 capable of taking up and retaining sulfur components (SOx and the like) contained in incoming exhaust gas, and a NOx retainer agent 62 capable of purifying components of incoming exhaust gas which are other than the sulfur components and, in particular, NOx, from incoming exhaust gas.

The sulfur component retainer agent 61 is contained in a casing 64 that is disposed in an exhaust pipe (exhaust passageway) 63 connected to an outlet opening of the exhaust turbine 21. The sulfur component retainer agent 61 is provided with a temperature sensor 65 for detecting the temperature of the sulfur component retainer agent 61. The temperature sensor 65 is connected to the input port 45 of the ECU 40 via a corresponding A/D converter 47. A downstream end of the exhaust pipe 63 is connected to an exhaust pipe 66. The exhaust pipe 66 includes an upstream-side exhaust pipe 66a, a branching portion 66b, a retainer agent-side branch pipe 66c, a bypass-side branch pipe (bypass passageway) 66d, and a downstream-side exhaust pipe 66e. The exhaust pipe 66 is provided with the NOx retainer agent 62 contained in a casing 67 that is disposed in the retainer agent-side branch pipe 66c.

The exhaust pipe 66 will be further described in detail. The exhaust pipe 63, disposed upstream of the exhaust pipe 66, is connected to the upstream-side exhaust pipe 66a. The upstream-side exhaust pipe 66a branches, at a branching portion 66b, into the retainer agent-side branch pipe 66c and the bypass-side branch pipe 66d that bypasses the NOx retainer agent 62. The branch pipes 66c, 66d merge into the downstream-side exhaust pipe 66e, downstream of the NOx retainer agent 62. The branching portion 66b is provided with a flow regulator valve 68. The flow regulator valve 68 is controlled by a flow regulator valve-driving stepping motor 69 that is connected to the output port 46 of the ECU 40 via a corresponding drive circuit 48.

The flow regulator valve 68 is able to adjust the amount of flow of exhaust gas into the bypass-side branch pipe 66d. In particular, the flow regulator valve 68 is able to adjust the proportion of the amount of flow of exhaust gas into the retainer agent-side branch pipe 66c to the amount of flow of exhaust gas into the bypass-side branch pipe 66d, in accordance with the operating position of the valve. For example, the flow regulator valve 68 is oscillatable between the position to close the bypass-side branch pipe 66d (i.e., the position indicated by a solid line in FIG. 2) and the position to close the retainer agent-side branch pipe 66c (i.e., the position indicated by a broken line in FIG. 2), and the amounts of flow of exhaust gas into the branch pipes 66c, 66d are determined in accordance with the angle θ of the valve from the position to close the retainer agent-side branch pipe 66c.

In the following description, the ratio between the air and the fuel supplied to the exhaust passageway upstream of the NOx retainer agent 62, the combustion chamber 5 and the intake passageway will be referred to as "exhaust gas air-fuel ratio". The NOx retainer agent 62 of the exhaust emission control apparatus 23 takes up and retains NOx from incoming exhaust gas if the incoming exhaust gas air-fuel ratio is lean of stoichiometry. If the incoming exhaust gas air-fuel ratio is substantially equal to a stoichiometric air-fuel ratio, or is rich of stoichiometry, the NOx retainer agent 62 releases NOx retained by the agent. Furthermore, if the incoming exhaust gas air-fuel ratio is rich of stoichiometry, the NOx released from the NOx retainer agent 62 is reduced and thus purified.

The above-described NOx retainer agent 62 becomes unable to capture and retain any more NOx when the amount of NOx retained becomes great. That is, if the air-fuel ratio of exhaust gas flowing into the NOx retainer agent 62 is kept lean of stoichiometry, the NOx retaining capability of the NOx retainer agent 62 decreases so that the NOx retainer agent 62 cannot capture NOx. As a result, exhaust gas contains NOx even after passing through the NOx retainer agent 62. Therefore, in this invention, if the amount of NOx retained in the NOx retainer agent 62 exceeds a pre-set NOx saturation amount, a NOx releasing process (rich spike) is performed in which exhaust gas having a substantially stoichiometric or rich air-fuel ratio is supplied to the NOx retainer agent 62. Due to this releasing process, NOx retained by the NOx retainer agent 62 is released, and is reduced.

The NOx releasing process will be described in more detail below. First, the NOx in exhaust gas flowing into the NOx retainer agent 62 is detected by a NOx sensor 70 disposed upstream of the NOx retainer agent 62. Subsequently, the amount of NOx retained in the NOx retainer agent 62 is estimated on the basis of a result of the aforementioned detection of NOx. Then, when the estimated amount of NOx reaches or exceeds the aforementioned NOx saturation amount, that is, when the NOx retaining capability of the NOx retainer agent 62 deteriorates, the NOx releasing process is performed. At the time of performing the NOx releasing process, the air-fuel ratio of exhaust gas discharged from the internal combustion engine is adjusted so that the air-fuel ratio of exhaust gas flowing into the NOx retainer agent becomes substantially stoichiometric or rich of stoichiometry. In this case, it is also conceivable that fuel present in exhaust gas may be consumed by the sulfur component retainer agent 61 disposed upstream of the NOx retainer agent 62. Therefore, the air-fuel ratio of exhaust gas discharged from the internal combustion engine is adjusted so that the air-fuel ratio of exhaust gas remains substantially stoichiometric or rich of stoichiometry even after passage through the sulfur component retainer agent 61. Due to the NOx releasing process, most of the NOx retained by the NOx retainer agent 62 is released and reduced, and therefore the NOx retaining capability of the NOx retainer agent 62 is recovered.

The NOx retainer agent 62 takes up and retains sulfur components from incoming exhaust gas, as well as NOx. As sulfur components are taken up and retained by the NOx retainer agent 62, the NOx retaining capability of the NOx retainer agent 62 decreases. The decrease in the NOx retaining capability of the NOx retainer agent 62 caused by the sulfur components retained in the NOx retainer agent 62 will hereinafter be referred to as "sulfur poisoning" of the NOx retainer agent 62. Due to the sulfur poisoning, the amount of NOx retainable by the NOx retainer agent 62 decreases if the amount of sulfur components retained by the NOx retainer agent 62 increases.

In order to prevent the progress of the sulfur poisoning of the NOx retainer agent 62 and therefore prevent deterioration of the NOx retaining capability of the NOx retainer agent 62, it is preferable to prevent the entrance of sulfur components into the NOx retainer agent 62. Therefore, in the exhaust emission control apparatus 23 shown in FIGS. 1 and 2, the sulfur component retainer agent 61 capable of taking up and retaining sulfur components from incoming exhaust gas is disposed upstream of the NOx retainer agent 62 in terms of the flowing direction of exhaust gas. If the sulfur component retainer agent 61 takes up and retains substantially the entire amount of sulfur components contained in the exhaust gas that flows into the sulfur component retainer agent 61, the exhaust gas flowing into the NOx retainer agent 62 will be substantially free of sulfur components, and therefore, the sulfur poisoning of the NOx retainer agent 62 will be prevented.

However, in reality, the sulfur component retainer agent 61 is not always able to capture and retain substantially the entire amount of sulfur components contained in incoming exhaust gas. Furthermore, a certain amount of the sulfur components taken up by the sulfur component retainer agent 61 may be released in some cases. Therefore, the amount of sulfur components contained in the exhaust gas that flows out of the sulfur component retainer agent 61 (hereinafter, referred to as "the amount of outgoing sulfur components") changes. The amount of outgoing sulfur components changes in accordance with various parameters regarding the sulfur component retainer agent 61. One of the parameters is the amount of sulfur components retained by the sulfur component retainer agent 61. For example, there is a tendency for the amount of outgoing sulfur components to increase as the amount of sulfur components retained by the sulfur component retainer agent 61 increases. This tendency is particularly remarkable if the air-fuel ratio of exhaust gas flowing into the sulfur component retainer agent 61 is substantially stoichiometric or rich of stoichiometry. That is, the amount of outgoing sulfur components corresponding to a great amount of sulfur components retained by the sulfur component retainer agent 61 is greater in the case where the air-fuel ratio of exhaust gas flowing into the sulfur component retainer agent 61 is substantially stoichiometric or rich of stoichiometry than in the case where the air-fuel ratio of the exhaust gas is lean of stoichiometry.

When the above-described NOx releasing process has been performed, the air-fuel ratio of exhaust gas flowing into the sulfur component retainer agent 61 is substantially stoichiometric or rich of stoichiometry. Therefore, if at this time, the amount of sulfur components retained by the sulfur component retainer agent 61 is great, the sulfur component retainer agent 61 does not sufficiently capture and retain sulfur components from the incoming exhaust gas, or releases sulfur components retained in the agent 61. As a result, sulfur components enter the NOx retainer agent 62. Hence, the sulfur poisoning of the NOx retainer agent 62 progresses, and the NOx retaining capability of the NOx retainer agent 62 decreases.

However, in the exhaust emission control apparatus 23 of the first embodiment of the invention, the air-fuel ratio of exhaust gas flowing into the sulfur component retainer agent 61 is prohibited from becoming substantially stoichiometric or rich of stoichiometry if the amount of sulfur components retained by the sulfur component retainer agent 61 is equal to or greater than a predetermined amount. More specifically, if the amount of sulfur components retained by the sulfur component retainer agent 61 is greater than or equal to the predetermined amount, the air-fuel ratio of exhaust gas flowing into the sulfur component retainer agent 61 is controlled so as to become lean of stoichiometry. The process of releasing NOx from the NOx retainer agent 62 involves the inflow of exhaust gas having a substantially stoichiometric or rich air-fuel ratio into the sulfur component retainer agent 61. Therefore, when the amount of sulfur components retained by the sulfur component retainer agent 61 is greater than or equal to the predetermined amount, execution of the NOx releasing process is avoided even if the amount of NOx retained by the NOx retainer agent 62 exceeds the NOx saturation amount.

Therefore, according to the first embodiment of the invention, the air-fuel ratio of exhaust gas that flows into the sulfur component retainer agent 61 is not allowed to become substantially stoichiometric or rich of stoichiometry in the case where the amount of sulfur components retained by the sulfur component retainer agent 61 is greater than or equal to a predetermined amount, that is, in the case where sulfur components retained by the sulfur component retainer agent 61 will be released and therefore the amount of sulfur components going out of the sulfur component retainer agent 61 will increase if the air-fuel ratio of exhaust gas that flows into the sulfur component retainer agent 61 should be substantially stoichiometric or rich of stoichiometry. This fashion of control prevents release of sulfur components from the sulfur component retainer agent 61, and therefore prevents increase in the amount of sulfur components that go out of the sulfur component retainer agent 61.

It is to be noted herein that the sulfur component retainer agent 61 used in the exhaust emission control apparatus 23 of the first embodiment is not capable of limitlessly taking up and retain sulfur components. Instead, the amount of sulfur components retainable by the sulfur component retainer agent 61 is fixed. Therefore, the sulfur component retainer agent 61 will become unable to taken up and retain any more sulfur components unless sulfur components retained by the sulfur component retainer agent 61 are released. That is, if the amount of sulfur components retained by the sulfur component retainer agent 61 is substantially equal to a predetermined amount, the amount of outgoing sulfur components does not increase provided that the air-fuel ratio of exhaust gas flowing into the sulfur component retainer agent 61 is lean of stoichiometry. However, if the amount of sulfur components retained by the sulfur component retainer agent 61 is greater than the predetermined amount, the amount of outgoing sulfur components becomes great even in the case where the air-fuel ratio of exhaust gas flowing into the sulfur component retainer agent 61 is lean of stoichiometry. Therefore, it becomes necessary to release sulfur components from the sulfur component retainer agent sooner or later.

With regard to the sulfur component retainer agent 61 in the first embodiment, sulfur components retained in the sulfur component retainer agent 61 are released if a condition for releasing sulfur components is fulfilled. The condition for releasing sulfur components from the sulfur component retainer agent 61 in this embodiment is a condition that the air-fuel ratio of incoming exhaust gas be substantially stoichiometric or rich of stoichiometry, and that the temperature of the sulfur component retainer agent be higher than or equal to a sulfur component release temperature.

In an exhaust emission control apparatus 23 in accordance with a second embodiment of the invention, the condition for releasing sulfur components is caused to be fulfilled so as to release sulfur components from the sulfur component retainer agent 61 (retainer agent regenerating process) if the amount of sulfur components retained by the sulfur component retainer agent 61 is greater than or equal to the predetermined amount and it is possible to release sulfur components from the sulfur component retainer agent. In particular, according to the sulfur component retainer agent 61 in the second embodiment, in the case where the amount of sulfur components retained by the sulfur component retainer agent 61 is greater than or equal to the predetermined amount and where sulfur components can be released from the sulfur component retainer agent, sulfur components are released from the sulfur component retainer agent 61 by adjusting the air-fuel ratio of exhaust gas that flows into the sulfur component retainer agent 61 to a substantially stoichiometric or rich air-fuel ratio and causing the temperature of the sulfur component retainer agent 61 to be higher than or equal to the sulfur component release temperature. In particular, if a first predetermined amount of sulfur components retained which serves as a criterion for determining whether or not to prohibit the exhaust gas air-fuel ratio from becoming rich of stoichiometry in the first embodiment and a second predetermined amount of sulfur components retained which serves as a criterion for the retainer agent regenerating process in this embodiment are equal to each other, the following process is performed. That is, in the case where the amount of sulfur components retained by the sulfur component retainer agent 61 is greater than or equal to the predetermined amount and where sulfur components cannot be released from the sulfur component retainer agent 61, the air-fuel ratio of exhaust gas that flows into the sulfur component retainer agent 61 is prohibited from becoming substantially stoichiometric or rich of stoichiometry. The case where sulfur components can be released from the sulfur component retainer agent 61 means a case where the condition for releasing sulfur components can easily be fulfilled. An example of the case is a case where the temperature of the sulfur component retainer agent 61 is not higher than necessary, and where the air-fuel ratio of exhaust gas flowing into the sulfur component retainer agent 61 is substantially stoichiometric or rich of stoichiometry, and where the temperature of the sulfur component retainer agent 61 can reach the sulfur component release temperature.

Due to execution of the retainer agent regenerating process, the amount of sulfur components retained by the sulfur component retainer agent 61 becomes substantially zero, and the amount of sulfur components that can be taken up and retained by the sulfur component retainer agent 61 is maximized.

At the time of release of sulfur components from the sulfur component retainer agent 61, the concentration of sulfur components contained in exhaust gas flowing out of the sulfur component retainer agent 61 is higher than the concentration of sulfur components contained in exhaust gas discharged from the internal combustion engine. At the time of execution of the process of regenerating the sulfur component retainer agent 61 of the exhaust emission control apparatus 23 of the second embodiment, the condition for releasing sulfur components is caused to be fulfilled, and the operating position of the flow regulator valve 68 is changed to a bypass position. Therefore, if the condition for releasing sulfur components is fulfilled, substantially no exhaust gas flows into the NOx retainer agent 62. Consequently, the inflow of exhaust gas having a high concentration of sulfur components into the NOx retainer agent 62 is prevented.

As described above, the sulfur component retainer agent 61 is able to capture and retain sulfur components from incoming exhaust gas, and is able to release sulfur components if the condition for releasing sulfur components is met. At the time of release of sulfur components from the sulfur component retainer agent 61, the passage of exhaust gas through the NOx retainer agent 62 is avoided, so that the inflow of sulfur components into the NOx retainer agent 62 is prevented. The use of the sulfur component retainer agent 61 removes sulfur components contained in exhaust gas discharged from the engine, at a site upstream of the NOx retainer agent 62.

The amount of outgoing sulfur components in the foregoing description is equivalent to the amount of sulfur components contained in exhaust gas that flows out of the sulfur component retainer agent 61. That is, the amount of outgoing sulfur components is the sum of the amount of sulfur components that has passed through the sulfur component retainer agent 61 without being retained, and the amount of sulfur components once retained by the sulfur component retainer agent 61 and then released therefrom.

Next described will be a criterion for determining whether it is possible to release sulfur components from the sulfur component retainer agent 61. Conceivable examples of the criterion include the following three criterions. The first criterion is relevant to the state of operation of the internal combustion engine. As mentioned above, the air-fuel ratio of exhaust gas that flows into the sulfur component retainer agent 61 must be rich of stoichiometry in order to release sulfur components from the sulfur component retainer agent 61. However, if the engine is a compression self-ignition type diesel internal combustion engine as in this embodiment, it is difficult to adjust the air-fuel ratio of exhaust gas discharged from the engine to the rich side of stoichiometry unless the load on the engine is relatively low. Therefore, with regard to the first criterion, it is determined that it is not possible to release sulfur components from the sulfur component retainer agent 61 if the load on the internal combustion engine is higher than a predetermined value. If the load on the internal combustion engine is lower than the predetermined value, it is determined that it is possible to release sulfur components from the sulfur component retainer agent 61.

The second criterion is relevant to release of sulfur components into the atmosphere. In general, during execution of the retainer agent regenerating process, the exhaust gas flowing out of the sulfur component retainer agent 61 contains a large amount of sulfur components. Therefore, if the retainer agent regenerating process is performed during a stop of a vehicle equipped with the exhaust emission control apparatus 23 of the embodiment, a large amount of sulfur components will be discharged locally into a small region of the atmosphere. Such local existence of sulfur components and, more particularly, SOx and $H_2S$, in the atmosphere is undesirable. With regard to the second criterion, it is determined that it is not possible to release sulfur components from the sulfur component retainer agent 61, if the execution of the retainer agent regenerating process would result in discharge of at least a predetermined amount of sulfur components into a small region of the atmosphere. If the execution of the retainer agent regenerating process will not result in discharge of at least the predetermined amount of sulfur components into a small region of the atmosphere, it is determined that it is possible to release sulfur components from the sulfur component retainer agent 61.

Figure 6:
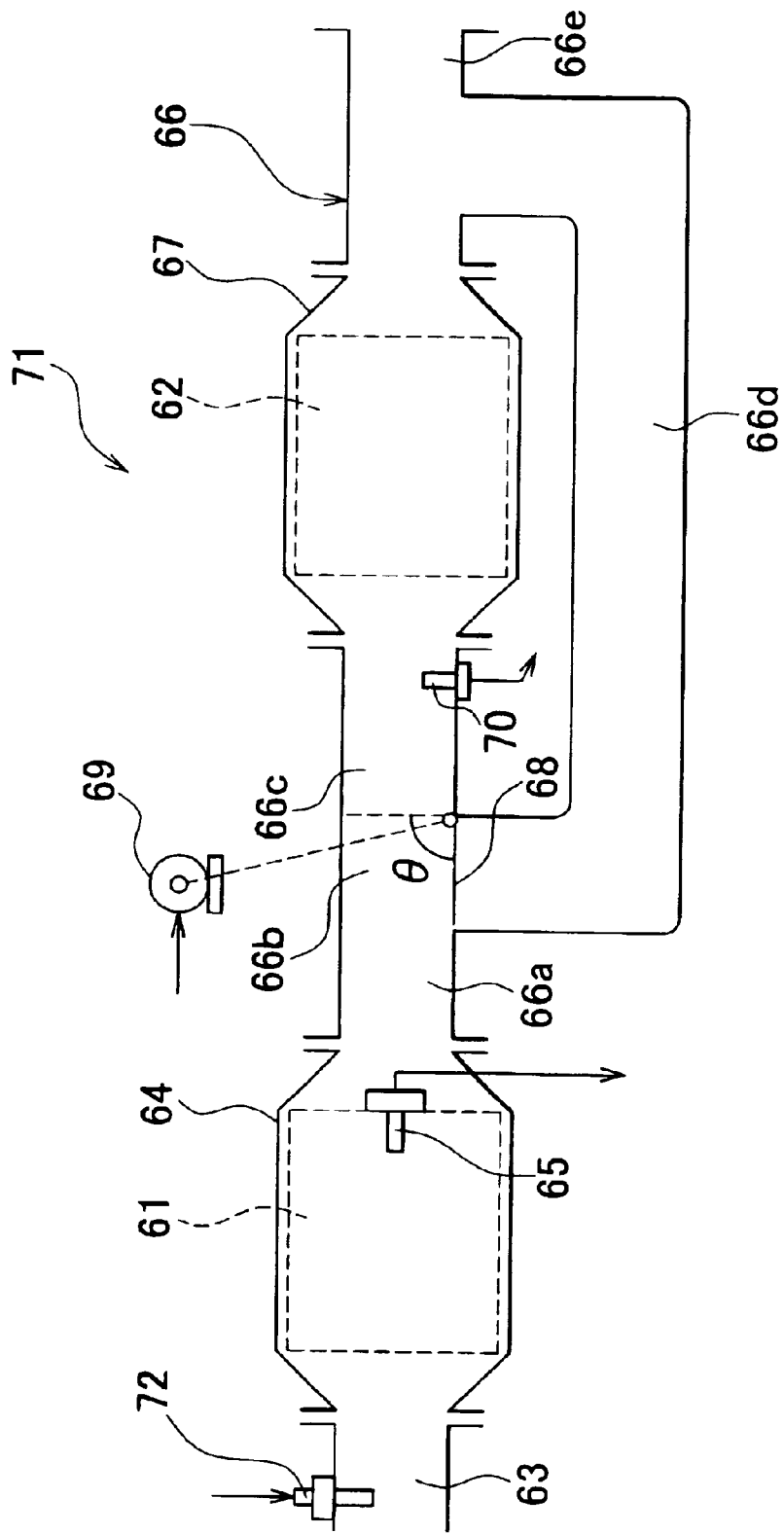
FIG. 6 is a diagram illustrating an exhaust emission control apparatus according to a fifth embodiment of the invention.

The third criterion is relevant to the case where the retainer agent regenerating process is performed by using a fuel supply device 72 (see FIG. 6). In general, during operation of an internal combustion engine at high load and high speed, the amount of flow of exhaust gas discharged from the engine is large, and the temperature of the exhaust gas is high. Conversely, during operation of an internal combustion engine at low load and low speed, the amount of flow of exhaust gas discharged from the engine is small, and the temperature of the exhaust gas is low. The retainer agent regenerating process by dispensing fuel into exhaust gas via the fuel supply device 72 disposed upstream of the sulfur component retainer agent 61 is performed in the following fashion. During high-load and high-speed operation of the engine, the amount of flow of exhaust gas is great, and therefore a large amount of fuel is dispensed in order to shift the air-fuel ratio of exhaust gas to a substantially stoichiometric or rich air-fuel ratio. The temperature of the sulfur component retainer agent 61 rises due to the reactions of the dispensed fuel in the sulfur component retainer agent 61 as well as the inflow of high-temperature exhaust gas from the engine. Therefore, the temperature of the sulfur component retainer agent 61 considerably exceeds the sulfur component release temperature, thus causing a degraded function of the sulfur component retainer agent 61 and melt loss of the support of the sulfur component retainer agent 61.

If the engine is being operated at low load and low speed at the time of execution of the retainer agent regenerating process using the fuel supply device 72, the dispensed fuel does not sufficiently react in the sulfur component retainer agent 61 due to the small amount of flow of exhaust gas through the sulfur component retainer agent 61. Therefore, the temperature of the sulfur component retainer agent 61 does not exceed the sulfur component release temperature. Hence, with regard to the third criterion, it is determined that it is not possible to release sulfur components from the sulfur component retainer agent 61 in the case where the internal combustion engine is being operated at a load and a rotation speed that are higher than a predetermined first load and a predetermined first rotation speed, respectively, when the retainer regenerating process is to be performed, and in the case where the engine is being operated at a load and a rotation speed that are lower than a predetermined second load and a predetermined second rotation speed, respectively, when the retainer regenerating process is to be performed. In other cases, it is determined that it is possible to release sulfur components from the sulfur component retainer agent 61.

In the determination as to whether it is possible to release sulfur components from the sulfur component retainer agent 61, only one of the aforementioned three criterions may be used, or a combination of two of the three criterions or all the three criterions may also be used.

Next described will be a control of prohibiting the NOx releasing process in the exhaust emission control apparatus 23 of the second embodiment of the invention. In the control of prohibiting the NOx releasing process, the amount Qs of sulfur components retained by the sulfur component retainer agent 61 is first computed by a method described below, and it is determined whether it is possible to release sulfur components from the sulfur component retainer agent 61, by the above-described method. If the calculated amount Qs of sulfur components retained is greater than or equal to the predetermined amount Qsd and it is not possible to release sulfur components from the sulfur component retainer agent 61, the NOx releasing process on the NOx retainer agent 62 is prohibited. The prohibition of the NOx releasing process on the NOx retainer agent 62 is continued until it becomes possible to release sulfur components from the sulfur component retainer agent 61. Thus, release of sulfur components from the sulfur component retainer agent 61 is prevented, and therefore increase in the amount of outgoing sulfur components is prevented, even if the amount Qs of sulfur components retained is greater than or equal to the predetermined amount Qsd.

If the calculated amount Qs of sulfur components retained is greater than or equal to the predetermined amount Qsd and it is possible to release sulfur components from the sulfur component retainer agent 61, the retainer agent regenerating process in which sulfur components are released from the sulfur component retainer agent 61 is performed. For example, after injection of fuel into the combustion chamber 5 of the engine in order to drive the engine, a small amount of fuel is injected, whereby the air-fuel ratio of exhaust gas that flows into the sulfur component retainer agent 61 is shifted to a substantially stoichiometric or rich air-fuel ratio and the temperature of the sulfur component retainer agent 61 is raised to or above the sulfur component release temperature. Therefore, the amount Qs of sulfur components retained by the sulfur component retainer agent 61 becomes substantially zero, and the amount of sulfur components that can be taken up and retained by the sulfur component retainer agent 61 increases.

In order to calculate the amount Qs of sulfur components retained, that is, the amount of sulfur components retained by the sulfur component retainer agent 61, the total amount of fuel supplied to the exhaust passageway upstream of the sulfur component retainer agent 61, the combustion chamber, and the intake passageway is detected. The amount of fuel supplied and the amount of sulfur components are in a proportion relationship since the amount of sulfur components contained in fuel is constant regardless of the sites of supply of fuel. Therefore, the amount of sulfur components entering the sulfur component retainer agent 61 can be calculated by estimating the amount of sulfur components contained in exhaust gas that flows into the sulfur component retainer agent 61 from the detected total amount of fuel supplied. From a result of calculation, an amount Qs of sulfur components retained by the sulfur component retainer agent 61 is estimated. It is to be noted herein that if the retainer agent regenerating process is performed, the amount Qs of sulfur components retained is reset to zero.

The control of raising the temperature of the sulfur component retainer agent 61 is performed by, for example, retarding the timing of injecting fuel into the combustion chamber 5 of the engine, or injecting and burning a small amount of fuel after injection of fuel into the combustion chamber 5 of the engine for the purpose of driving the engine, or operating an electric heater or a glow plug provided upstream of the NOx retainer agent 62, or dispensing fuel into exhaust gas via a device provided for dispensing fuel into exhaust gas upstream of the sulfur component retainer agent 61 so as to raise the temperature of exhaust gas, or causing chemical reactions in the sulfur component retainer agent 61 and thereby generating heat. If an ignition plug for igniting fuel is provided in the combustion chamber 5, the fuel injection timing of the ignition plug may be retarded so as to raise the temperature of the sulfur component retainer agent 61.

Figure 3:
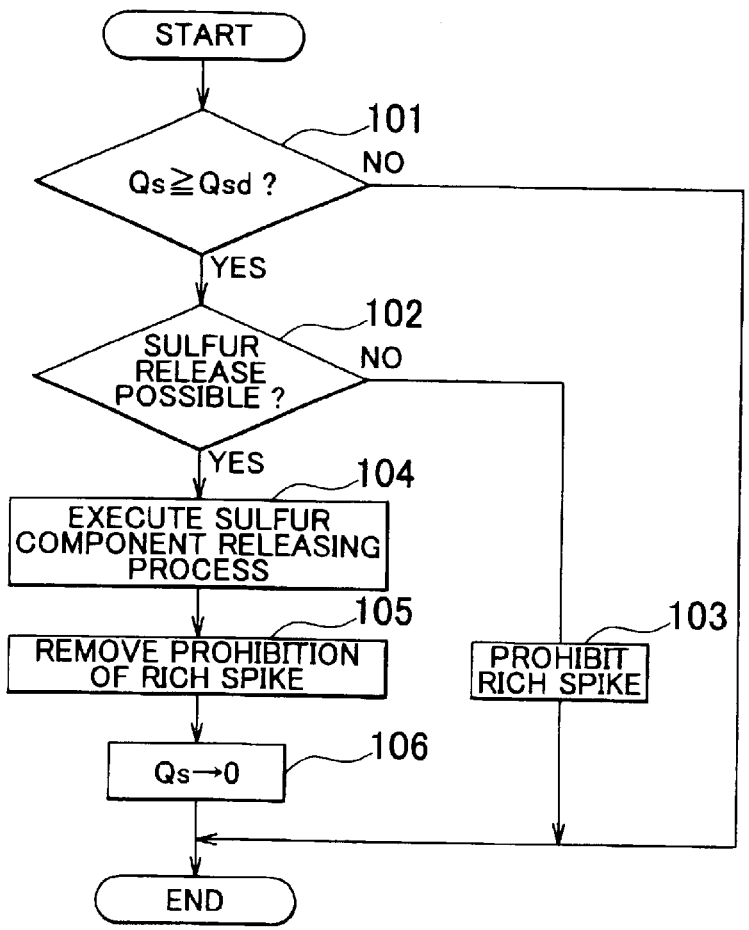
FIG. 3 is a flowchart illustrating a NOx releasing process prohibiting control in an exhaust emission control apparatus according to a second embodiment of the invention.

A control routine of prohibiting the NOx releasing process in accordance with the second embodiment of the invention will be described with reference to FIG. 3. First, it is determined in step 101 whether the amount Qs of sulfur components retained by the sulfur component retainer agent 61 is greater than or equal to the predetermined amount Qsd. If it is determined that the amount Qs of sulfur components retained is less than the predetermined amount Qsd, this control routine ends. Conversely, if it is determined in step 101 that the amount Qs of sulfur components retained is greater than or equal to the predetermined amount Qsd, the process proceeds to step 102. In step 102, it is determined whether it is possible to release sulfur components. If it is determined that it is not possible to release sulfur components, the process proceeds to step 103. In step 103, the NOx releasing process on the NOx retainer agent 62 is prohibited. Subsequently, the control routine ends. Conversely, if it is determined in step 102 that sulfur components can be released, the process proceeds to step 104, in which the retainer agent regenerating process is performed. Subsequently in step 105, prohibition of the NOx releasing process is removed if the NOx releasing process has been prohibited. Subsequently in step 106, the amount Qs of sulfur components retained by the sulfur component retainer agent 61 is reset to zero. After that, the control routine ends.

Figure 4:
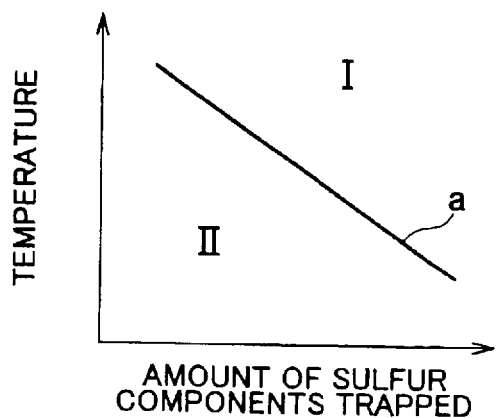
FIG. 4 is a graph indicating a relationship between the amount of sulfur components retained by a sulfur component retainer agent and the temperature of the sulfur component retainer agent in a case where the amount of outgoing sulfur components is great.

A third embodiment of the invention will be described. As mentioned above, the amount of sulfur components that go out of the sulfur component retainer agent 61 changes in accordance with a parameter regarding the sulfur component retainer agent 61. Although in the first embodiment, the parameter is the amount of sulfur components retained by the sulfur component retainer agent 61, other parameters exist and may be used. For example, the temperature of the sulfur component retainer agent 61 may be used as the aforementioned parameter. As the temperature of the sulfur component retainer agent 61 rises, the amount of outgoing sulfur components increases. Therefore, the amount of sulfur components going out of the sulfur component retainer agent 61 is a function of the amount of sulfur components retained by the sulfur component retainer agent 61 and the temperature of the sulfur component retainer agent 61. FIG. 4 indicates a relationship between the amount of sulfur components retained by the sulfur component retainer agent 61 and the temperature of the sulfur component retainer agent 61. In the graph of FIG. 4, the horizontal axis indicates the amount of sulfur components retained by the sulfur component retainer agent 61, and the vertical axis indicates the temperature of the sulfur component retainer agent 61.

In FIG. 4, the line a indicates a relationship between the feasible amount of sulfur components retained and the temperature of the sulfur component retainer agent 61. In a region I above the line a in which the amount of sulfur components retained is relatively great and the temperature of the sulfur component retainer agent 61 is relatively high, sulfur components retained by the sulfur component retainer agent 61 are released, and the amount of outgoing sulfur components increases. In a region II below the line a in which the amount of sulfur components retained is relatively small and the temperature of the sulfur component retainer agent 61 is relatively low, substantially no sulfur component is released from the sulfur component retainer agent 61, and therefore the amount of outgoing sulfur components is small.

In the third embodiment of the invention, the predetermined amount of sulfur components retained (first predetermined amount), that is, the criterion for determining whether or not to prohibit the air-fuel ratio of exhaust gas flowing into the sulfur component retainer agent 61 from being shifted to a substantially stoichiometric or rich air-fuel ratio as mentioned above in conjunction with the first embodiment, is not fixed at a constant value, but is calculated from the temperature of the sulfur component retainer agent 61. That is, it is determined whether sulfur components retained by the sulfur component retainer agent 61 will be released and the amount of outgoing sulfur components will become great, on the basis of the amount of sulfur components retained by the sulfur component retainer agent 61 and the temperature of the sulfur component retainer agent 61. If it is determined that the amount of outgoing sulfur components will become great, the air-fuel ratio of exhaust gas flowing into the sulfur component retainer agent 61 is prohibited from becoming rich of stoichiometry, or the flow regulator valve 68 is operated and set so that exhaust gas flows via the bypass, and then sulfur components are released from the sulfur component retainer agent 61.

More specifically, a graph similar to the graph shown in FIG. 4 is determined through experiments or calculations beforehand, and is stored as data in the ROM 42 of the ECU 40. If the point of coordinates of the amount of sulfur components retained and the temperature of the sulfur component retainer agent 61 is in the region II in FIG. 4, the NOx releasing process is executed in a normal fashion. Then, when the point of coordinates of the amount of sulfur components retained and the temperature of the sulfur component retainer agent 61 reaches the region I in FIG. 4, it is determined whether it is possible to release sulfur components from the sulfur component retainer agent 61. In accordance with the determination, the retainer agent regenerating process is performed, or the NOx releasing process is prohibited.

Thus, the predetermined amount of sulfur components retained by the sulfur component retainer agent 61 is calculated from the temperature of the sulfur component retainer agent 61. Therefore, the third embodiment makes it possible to more precisely determine whether the amount of outgoing sulfur components will become great due to release of sulfur components from the sulfur component retainer agent 61 than in the first embodiment. As a result, it becomes possible to effectively set a timing of prohibiting the air-fuel ratio of exhaust gas flowing into the sulfur component retainer agent 61 from becoming substantially stoichiometric or rich of stoichiometry, and a timing of executing the retainer agent regenerating process. Therefore, occurrence of a great amount of outgoing sulfur components can be reliably prevented.

Figure 5A:
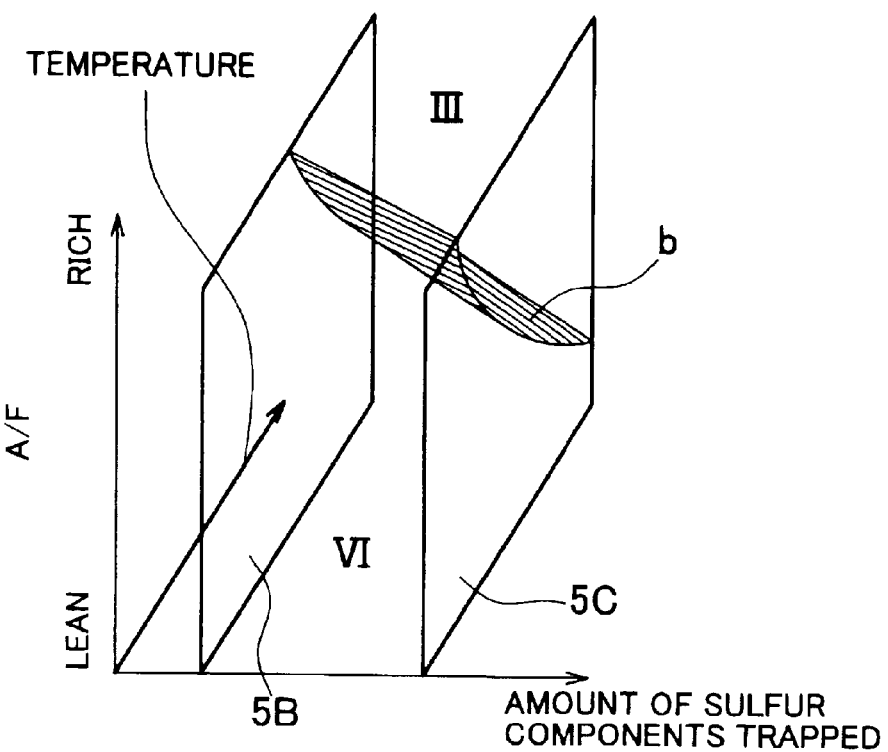
FIG. 5A is a diagram indicating relationships among the amount of sulfur components retained, the temperature of the sulfur component retainer agent, and the air-fuel ratio of incoming exhaust gas in a case where the amount of outgoing sulfur components is great.
Figure 5B:
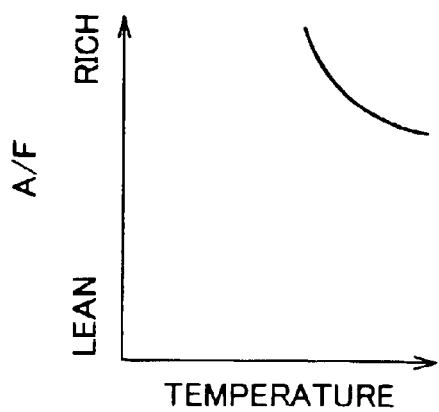
FIG. 5B indicates a section 5B indicated in FIG. 5A.
Figure 5C:
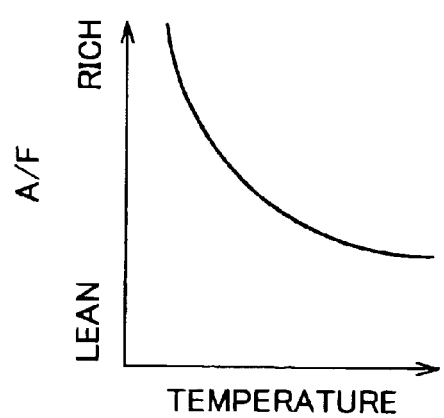
FIG. 5C indicates a section 5C indicated in FIG. 5A.

An exhaust emission control apparatus according to a fourth embodiment of the invention will next be described. Examples of the aforementioned parameter relevant to the sulfur component retainer agent 61 also include the air-fuel ratio of exhaust gas that flows into the sulfur component retainer agent 61. For example, if the air-fuel ratio of exhaust gas that flows into the sulfur component retainer agent 61 (hereinafter, referred to as "incoming exhaust gas air-fuel ratio") is small, that is, if the degree of richness of the incoming exhaust gas air-fuel ratio is high, the amount of sulfur components going out of the sulfur component retainer agent 61 increases. Therefore, the amount of sulfur components going out of the sulfur component retainer agent 61 is a function of the amount of sulfur components retained, the temperature of the sulfur component retainer agent 61, and the air-fuel ratio of incoming exhaust gas. FIGS. 5A to 5C indicate relationships among the amount of sulfur components retained, the temperature of the sulfur component retainer agent, and the air-fuel ratio of incoming exhaust gas. In FIG. 5A, the x-axis indicates the amount of sulfur components retained, and the y-axis indicates the temperature of the sulfur component retainer agent, and the z-axis indicates the air-fuel ratio of incoming exhaust gas. FIGS. 5B and 5C indicate a section 5B and a section 5C indicated in FIG. 5A.

A curved plane b indicated in FIG. 5A, similar to the line a in FIG. 4, indicates a relationship among the amount of sulfur components retainable, the temperature of the sulfur component retainer agent 61, and the air-fuel ratio of incoming exhaust gas. The amount of outgoing sulfur components is comparatively great in a region III defined by the curved plane b in which the amount of sulfur components retained is relatively great, and the temperature of the sulfur component retainer agent 61 is relatively high, and the air-fuel ratio of incoming exhaust gas is relatively small. The amount of outgoing sulfur components is comparatively small in a region IV defined by the curved plane b in which the amount of sulfur components retained is relatively small, and the temperature of the sulfur component retainer agent 61 is relatively low, and the air-fuel ratio of incoming exhaust gas is relatively great.

The exhaust emission control apparatus 23 of the fourth embodiment of the invention has substantially the same construction as the exhaust emission control apparatus of the third embodiment, but differs from the apparatus of the third embodiment in that the predetermined amount of sulfur components retained by the sulfur component retainer agent 61 is calculated from the temperature of the sulfur component retainer agent 61 and the air-fuel ratio of incoming exhaust gas. That is, in the fourth embodiment, it is determined whether the amount of sulfur components going out of the sulfur component retainer agent 61 will become great due to release of sulfur components from the sulfur component retainer agent 61, on the basis of the amount of sulfur components retained by the sulfur component retainer agent 61, the temperature of the sulfur component retainer agent 61, and the air-fuel ratio of incoming exhaust gas. If it is determined that the amount of outgoing sulfur components will become great, the air-fuel ratio of exhaust gas flowing into the sulfur component retainer agent is prohibited from becoming rich of stoichiometry, or sulfur components are released from the sulfur component retainer agent 61. In particular, in the fourth embodiment, the NOx releasing process on the NOx retainer agent 62 is stopped if during execution of the NOx releasing process, the air-fuel ratio of incoming exhaust gas becomes small, and sulfur components retained by the sulfur component retainer agent 61 are released, and therefore the amount of outgoing sulfur components increases. In the exhaust emission control apparatus 23 of the fourth embodiment, the NOx releasing process can be executed exactly until the amount of outgoing sulfur components increases due to release of sulfur components from the sulfur component retainer agent 61. Therefore, it is possible to effectively release NOx from the NOx retainer agent 62 while keeping the amount of outgoing sulfur components at a low level.

In this embodiment, it is determined whether the amount of outgoing sulfur components will become great, on the basis of the amount of sulfur components retained, or on the basis of the amount of sulfur components retained and the temperature of the sulfur component retainer agent, or on the basis of the amount of sulfur components retained, the temperature of the sulfur component retainer agent 61 and the air-fuel ratio of incoming exhaust gas. In practice, however, combinations other than the aforementioned combinations may also be adopted as a basis for the determination. That is, it is appropriate to determine whether the amount of outgoing sulfur components will become great on the basis of at least one of the three factors, that is, the amount of sulfur components retained, the temperature of the sulfur component retainer agent, and the air-fuel ratio of incoming exhaust gas.

An exhaust emission control apparatus 71 according to a fifth embodiment of the invention will next be described with reference to FIG. 6. The exhaust emission control apparatus 71 of the fifth embodiment has basically the same construction as the exhaust emission control apparatus 23 of the first embodiment, but differs from the apparatus of the first embodiment in that the exhaust emission control apparatus 71 of the fifth embodiment has a fuel supply device 72 upstream of the sulfur component retainer agent 61 as shown in FIG. 6. The fuel supply device 72 is able to dispense fuel into exhaust gas that flows into the sulfur component retainer agent 61. More specifically, the fuel supply device 72 is disposed near the sulfur component retainer agent 61 in such a manner that fuel is injected toward the sulfur component retainer agent 61. The fuel supply device 72 is connected to the output port 46 of the ECU 40 via a corresponding drive circuit 48. On the basis of a signal from the ECU 40, the amount of fuel supplied from the fuel supply device 72 into exhaust gas is adjusted.

In the first embodiment, for execution of the NOx releasing process on the NOx retainer agent 62, the air-fuel ratio of exhaust gas discharged from the internal combustion engine is adjusted so that the air-fuel ratio of exhaust gas flowing into the NOx retainer agent 62 becomes substantially stoichiometric or rich of stoichiometry. Furthermore, for execution of the retainer agent regenerating process on the sulfur component retainer agent 61, the temperature and the air-fuel ratio of exhaust gas discharged from the engine are adjusted so that the temperature of the sulfur component retainer agent 61 becomes higher than the sulfur component release temperature and the air-fuel ratio of exhaust gas flowing into the sulfur component retainer agent 61 becomes substantially stoichiometric or rich of stoichiometry. However, if the air-fuel ratio and the temperature of exhaust gas discharged from the internal combustion engine are adjusted in order to execute the NOx releasing process or the retainer agent regenerating process, the state of operation of the engine needs to be a state of operation that is different from an optimal state. Therefore, the stability of the internal combustion engine may degrade.

In contrast, in the exhaust emission control apparatus 71 of the fifth embodiment, the fuel supply device 72 supplies fuel into exhaust gas flowing into the sulfur component retainer agent 61, for execution of the NOx releasing process on the NOx retainer agent 62. When the NOx releasing process is performed in this case, the fuel supply device 72 supplies exhaust gas with an amount of fuel adjusted so that the air-fuel ratio of exhaust gas that flows into the NOx retainer agent 62 after passing through the sulfur component retainer agent 61 becomes substantially stoichiometric or rich of stoichiometry. Similarly, when the retainer agent regenerating process on the sulfur component retainer agent 61 is performed, the amount of fuel to be dispensed from the fuel supply device 72 is adjusted so that the air-fuel ratio of exhaust gas flowing into the sulfur component retainer agent 61 becomes substantially stoichiometric or rich of stoichiometry and so that the fuel that enters the sulfur component retainer agent 61 undergoes exothermic reactions in the sulfur component retainer agent 61, and therefore raises the temperature of the sulfur component retainer agent 61 to or above the sulfur component release temperature, and the thus-adjusted amount of fuel is supplied from the fuel supply device 72 into exhaust gas that flows into the sulfur component retainer agent 61. Hence, the NOx releasing process on the NOx retainer agent 62 and the retainer agent regenerating process on the sulfur component retainer agent 61 can be performed without the need to set the state of operation of the engine to a state that is different from the optimal state of operation.

Furthermore, if the fuel supply device 72 is disposed immediately upstream of the sulfur component retainer agent 61, it becomes possible to promptly supply fuel into exhaust gas when the NOx releasing process on the NOx retainer agent 62 needs to be executed, or when the retainer agent regenerating process on the sulfur component retainer agent 61 needs to be executed. Therefore, these processes can be more quickly performed in this embodiment than in the case where these processes are performed by changing the state of operation of the engine. Still further, the exhaust emission control apparatus of this embodiment may be combined with, for example, the exhaust emission control apparatus of the fourth embodiment. In this combination, the air-fuel ratio of exhaust gas flowing into the sulfur component retainer agent 61 can be promptly changed from a substantially stoichiometric or rich air-fuel ratio to a lean air-fuel ratio when the NOx releasing process on the NOx retainer agent 62 is prohibited during execution of the NOx releasing process.

Figure 7:
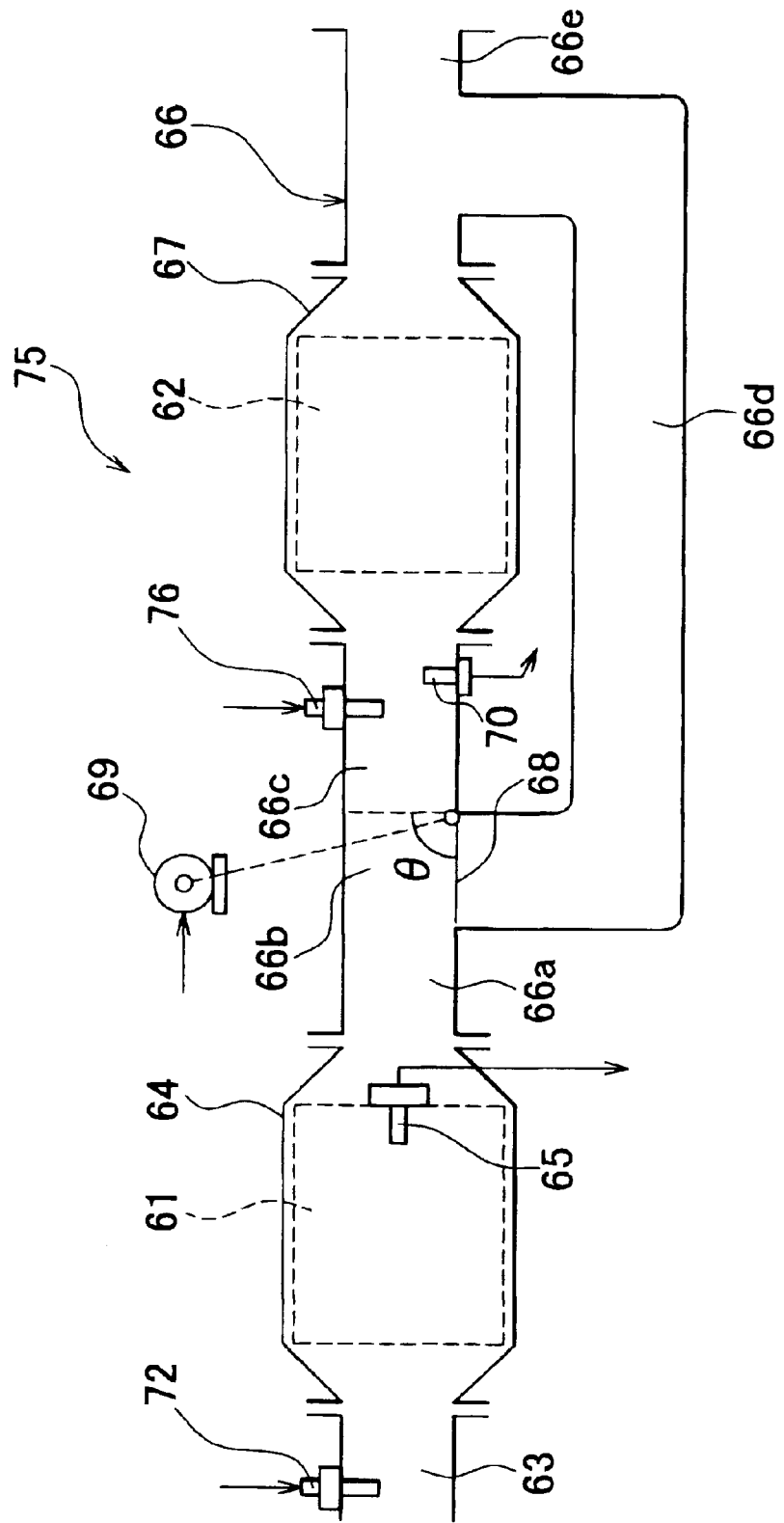
FIG. 7 is a diagram illustrating an exhaust emission control apparatus according to a sixth embodiment of the invention.

An exhaust emission control apparatus 75 according to a sixth embodiment of the invention will next be described with reference to FIG. 7. The exhaust emission control apparatus 75 of the sixth embodiment has basically the same construction as the exhaust emission control apparatus 71 of the fifth embodiment, but differs from the apparatus of the fifth embodiment in that the exhaust emission control apparatus 75 of the sixth embodiment has an additional fuel supply device 76 at a location that is downstream of the sulfur component retainer agent 61 and upstream of the NOx retainer agent 62. The additional fuel supply device 76 is able to dispense fuel in exhaust gas that flows into the NOx retainer agent 62. More specifically, the additional fuel supply device 76 is disposed downstream of the flow regulator valve 68 and near the NOx retainer agent 62 in such a manner that fuel is injected toward the NOx retainer agent 62. The additional fuel supply device 76 is connected to the output port 46 of the ECU 40 via a corresponding drive circuit 48. On the basis of a signal, the amount of fuel supplied from the fuel supply device 76 into exhaust gas is adjusted.

In the foregoing embodiments, if the amount of sulfur components retained by the sulfur component retainer agent 61 is greater than or equal to a predetermined amount and it is not possible to release fuel components from the sulfur component retainer agent 61, the air-fuel ratio of exhaust gas flowing into the sulfur component retainer agent 61 is prohibited from becoming substantially stoichiometric or rich of stoichiometry. However, if this state continues for a long time, the NOx retainer agent 62 becomes unable to capture and retain NOx from incoming exhaust gas, and therefore exhaust gas contains NOx even after passing through the NOx retainer agent 62. As a result, exhaust gas containing NOx is emitted into the atmosphere.

In contrast, in the exhaust emission control apparatus 75 of the sixth embodiment of the invention, the additional fuel supply device 76 supplies fuel into exhaust gas flowing into the NOx retainer agent 62 so as to shift the air-fuel ratio of exhaust gas flowing into the NOx retainer agent 62 to a substantially stoichiometric or rich air-fuel ratio, if NOx needs to be released from the NOx retainer agent 62 and the air-fuel ratio of exhaust gas flowing into the sulfur component retainer agent 61 is prohibited from becoming substantially stoichiometric or rich of stoichiometry. Thus, if the NOx retainer agent 62 becomes unable to retain more NOx, the operation of causing NOx to be taken up and retained by the NOx retainer agent 62 is avoided. Hence, emission of NOx-containing exhaust gas into the atmosphere is prevented.

It is to be noted herein that if fuel is dispensed from the additional fuel supply device 76, the sulfur components contained in the fuel dispensed from the additional fuel supply device 76 directly enter the NOx retainer agent 62 together with exhaust gas since the dispensed fuel does not pass through the sulfur component retainer agent 61. Therefore, if NOx needs to be released from the NOx retainer agent 62 and the air-fuel ratio of exhaust gas flowing into the sulfur component retainer agent 61 is not prohibited from becoming substantially stoichiometric or rich of stoichiometry, the supply of fuel from the additional fuel supply device 76 for execution of the NOx releasing process is avoided and the air-fuel ratio of exhaust gas flowing into the sulfur component retainer agent 61 is adjusted so that the air-fuel ratio of exhaust gas flowing into the NOx retainer agent 62 becomes substantially stoichiometric or rich of stoichiometry.

Many sulfur component retainer agents have NOx retaining capability similar to the capability of the NOx retainer agent 62. That is, such a sulfur component retainer agent takes up and retains NOx from the exhaust gas when the air-fuel ratio of incoming exhaust gas is lean of stoichiometry, and releases NOx when the air-fuel ratio of incoming exhaust gas is substantially stoichiometric or rich of stoichiometry. If the sulfur component retainer agent 61 in this embodiment is a sulfur component retainer agent having the NOx retaining capability, the NOx releasing process may be performed by providing exhaust gas having a substantially stoichiometric or rich air-fuel ratio upstream of the sulfur component retainer agent 61, so that NOx will be released not only from the NOx retainer agent 62 but also from the sulfur component retainer agent 61. Therefore, the NOx retaining capability of the sulfur component retainer agent as well as the NOx retaining capability of the NOx retainer agent 62 can be recovered.

Figure 8A:
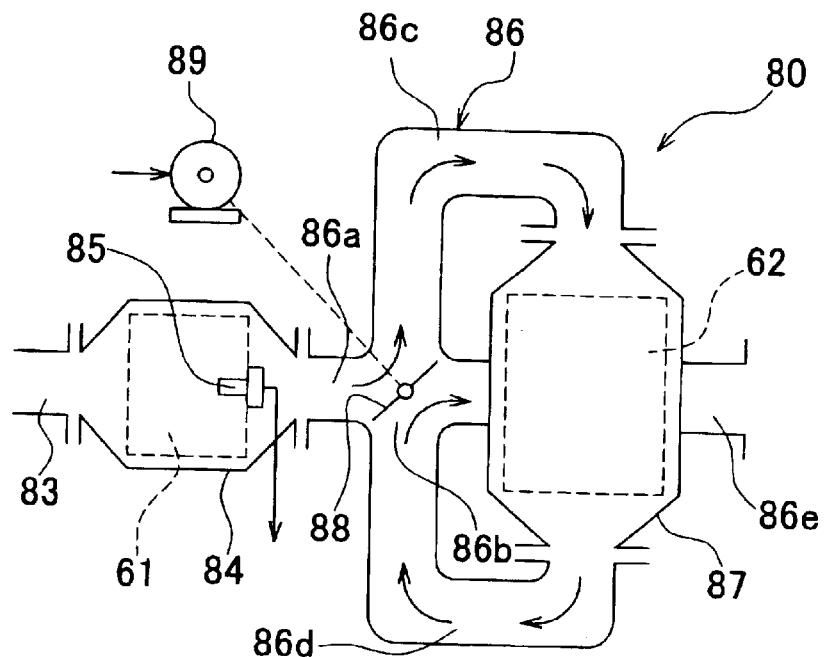
FIG. 8A is a diagram illustrating an exhaust emission control apparatus according to a seventh embodiment of the invention, where a flow regulator valve is set at a first operating position.
Figure 8B:
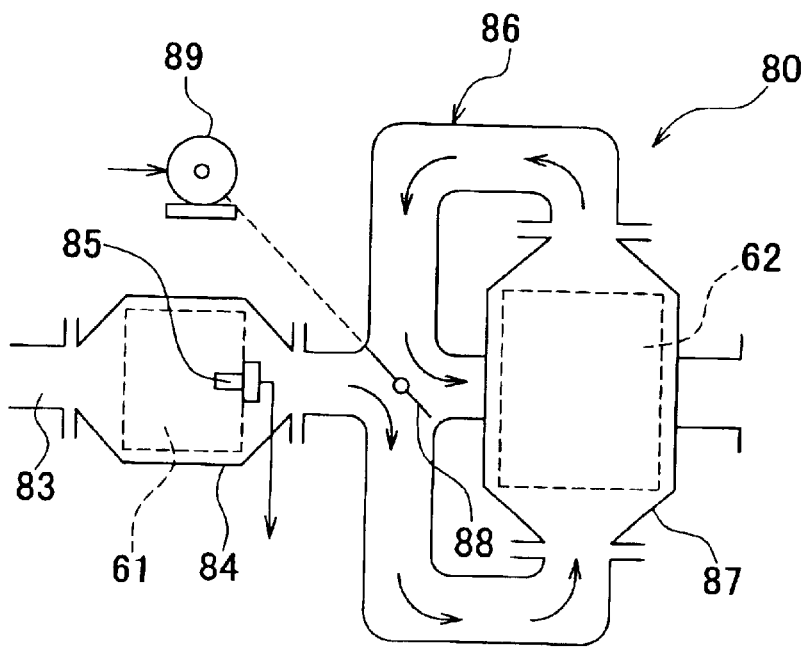
FIG. 8B is a diagram illustrating the exhaust emission control apparatus according to the seventh embodiment of the invention, where the flow regulator valve is set at a second operating position.
Figure 8C:
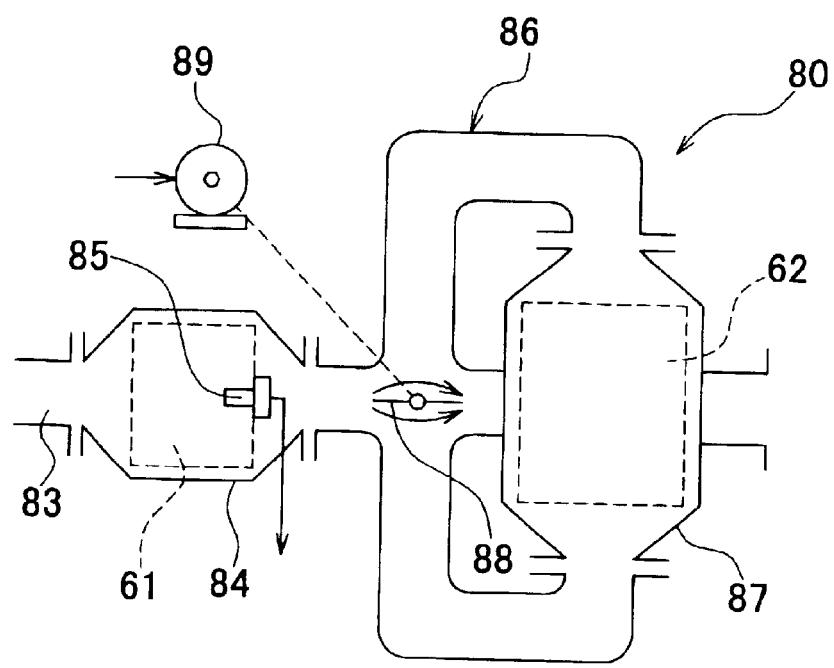
FIG. 8C is a diagram illustrating the exhaust emission control apparatus according to the seventh embodiment of the invention, where the flow regulator valve is set at a neutral operating position.

An exhaust emission control apparatus 80 according to a seventh embodiment of the invention will next be described with reference to FIGS. 8A to 8C. The exhaust emission control apparatus 80 of the seventh embodiment has basically the same construction as the exhaust emission control apparatus 23 of the first embodiment, except that an exhaust pipe 86 is different in construction from the exhaust pipe 66 of the first embodiment. FIGS. 8A, 8B and 8C, similar to FIG. 2, show the exhaust emission control apparatus 80 with a flow regulator valve 88 set at a first operating position, the apparatus 80 with the flow regulator valve 88 set at a second operating position, and the apparatus 80 with the flow regulator valve 88 set at a neutral operating position, respectively. In FIGS. 8A to 8C, arrows indicate streams of exhaust gas.

In the seventh embodiment shown in FIGS. 8A to 8C, the exhaust pipe 86 includes a truncal exhaust pipe 86a, 86e, and an annular branch pipe (annular passageways) 86c, 86d connected to the truncal exhaust pipe 86a, 86e. The annular branch pipe 86c, 86d is provided with a casing 87 that contains a NOx retainer agent 62. A branching portion 86b is provided at a connecting portion between the truncal exhaust pipe 86a, 86e and the annular branch pipe 86c, 86d. The annular branch pipe 86c, 86d branches from the branching portion 86b of the truncal exhaust pipes 86a, 86e, and returns to the branching portion 86b.

More specifically, the truncal exhaust pipe is made up of an upstream-side segmental exhaust pipe 86a extending upstream of the branching portion 86b, and a downstream-side segmental exhaust pipe 86e extending downstream of the branching portion 86b. The annular branch pipe is made up of a first segmental annular branch pipe 86c connecting the branching portion 86b and a first face of the NOx retainer agent 62, and a second segmental annular branch pipe 86d connecting the branching portion 86b and another face of the NOx retainer agent 62 remote from the first face. The upstream-side segmental exhaust pipe 86a branches, at the branching portion 86b, into three exhaust pipes, that is, the first segmental annular branch pipe 86c, the second segmental annular branch pipe 86d, and the downstream-side segmental exhaust pipe 86e. The upstream-side segmental exhaust pipe 86a and the downstream-side segmental exhaust pipe 86e are aligned substantially linearly. The first segmental annular branch pipe 86c and the second segmental annular branch pipe 86d branch from the branching portion 86b in directions opposite to each other and substantially perpendicular to the truncal exhaust pipe 86e.

The flow regulator valve 88 is provided in the branching portion 86b. The operation of the flow regulator valve 88 is controlled by a flow regulator valve-dedicated stepping motor 89 connected to the output port 46 of the ECU 40 via a corresponding drive circuit 48. The flow regulator valve 88 is continuously turned about a center of the branching portion 86b so that the valve angle θ varies with respect to an axis of the truncal exhaust pipe 86a, 86e. Of the amount of exhaust gas that flows from the upstream-side segmental exhaust pipe 86a into the branching portion 86b, the amounts of flow of exhaust gas into the first segmental annular branch pipe 86c and the second segmental annular branch pipe 86d are adjusted in accordance with the operation of the flow regulator valve 88.

The flow regulator valve 88 of the seventh embodiment is pivoted between three broadly divided operating positions of different angles. The three positions are the first operating position indicated in FIG. 8A, the second operating position indicated in FIG. 8B, and the neutral operating position indicated in FIG. 8C. When the flow regulator valve 88 is at the first operating position indicated in FIG. 8A, most of the inflow of exhaust gas from the upstream-side segmental exhaust pipe 86a into the branching portion 86b flows into the first segmental annular branch pipe 86c, and passes through the NOx retainer agent 62 in one direction, and flows through the second segmental annular branch pipe 86d, and then returns to the branching portion 86b. The exhaust gas that has returned to the branching portion 86b via the second segmental annular branch pipe 86d entirely flows out into the downstream-side segmental exhaust pipe 86e. In the description below, the direction in which exhaust gas flows through the annular branch pipe 86c, 86d and the NOx retainer agent 62 as described above is defined as a forward direction.

When the flow regulator valve 88 is set at the second operating position indicated in FIG. 8B, most of the inflow of exhaust gas from the upstream-side segmental exhaust pipe 86a into the branching portion 86b flows into the second segmental annular branch pipe 86d, and passes through the NOx retainer agent 62 in a direction opposite to the aforementioned flowing direction caused by the first operating position of the flow regulator valve 88, and flows through the first segmental annular branch pipe 86c, and then returns to the branching portion 86b. The exhaust gas that has returned to the branching portion 86b via the first segmental annular branch pipe 86c entirely flows out into the downstream-side segmental exhaust pipe 86e. In the description below, the direction in which exhaust gas flows through the second segmental annular branch pipe 86d, the NOx retainer agent 62 and then the first segmental annular branch pipe 86c is defined as a backward direction.

As described above, the inflow of exhaust gas from the upstream-side segmental exhaust pipe 86a into the branching portion 86b can be caused to flow through the annular branch pipe 86a, 86e provided with the NOx retainer agent 62 in either one of the two opposite flowing directions and then flow out into the downstream-side segmental exhaust pipe 86e via the branching portion 86b, in accordance with the operating position of the flow regulator valve 88.

According to the seventh embodiment, since the direction of flow of exhaust gas through the NOx retainer agent 62 is changeable between the forward and backward directions, it becomes possible to mitigate the positionally biased distribution of the amount of NOx retained in the NOx retainer agent 62 so as to allow more efficient use of the NOx retainer agent 62. Furthermore, if the NOx retainer agent is supported on a filter as described below, the employment of the exhaust emission control apparatus of the seventh embodiment will mitigate the positionally biased distribution of the amount of particulate matter trapped in the filter, and therefore will allow more efficient use of the filter 62. In this construction, the reversing of the flowing direction of exhaust gas will advantageously prevent the clogging of the filter.

When the flow regulator valve 88 is set at the neutral operating position indicated in FIG. 8C, most of the inflow of exhaust gas from the upstream-side segmental exhaust pipe 86a into the branching portion 86b does not flow into the annular branch pipe 86c, 86d, but directly flows into the downstream-side segmental exhaust pipe 86e. That is, when the flow regulator valve 88 is at the neutral operating position, exhaust gas flows out into the downstream-side segmental exhaust pipe 86e without passing through the NOx retainer agent 62. The neutral operating position of the flow regulator valve 88 in the seventh embodiment, similar to the bypass position of the flow regulator valve 68 in the foregoing embodiments, means a bypass position to bypass the NOx retainer agent 62.

The exhaust emission control apparatus of the seventh embodiment may be combined with any one of the first to sixth embodiments. In a combination with the sixth embodiment, a fuel supply device may be disposed either upstream or downstream of the flow regulator valve.

The aforementioned advantages of the above-described embodiment can also be achieved in an exhaust emission control apparatus equipped with a sulfur component retainer agent having a characteristic that as the amount of sulfur components retained increases, the amount of outgoing sulfur components increases particularly if the air-fuel ratio of exhaust gas flowing into the sulfur component retainer agent is substantially stoichiometric or rich of stoichiometry. In this case, the amount of sulfur components going out of the sulfur component retainer agent can be kept at or below a predetermined amount (predetermined amount of outgoing sulfur components) by prohibiting the air-fuel ratio of exhaust gas flowing into the sulfur component retainer agent from becoming rich of stoichiometry.

The NOx retainer agent 62 in the foregoing embodiments may be supported on a particulate filter that is able to trap particulate matter from incoming exhaust gas. The particulate filter may be equipped with an active oxygen generating agent so as to continuously oxidize and remove the particulate matter trapped by the filter by a mechanism described below. The active oxygen generating agent, similar to the NOx retainer agent 62 in the foregoing embodiments, is able to capture and retain sulfur components from incoming exhaust gas and release the sulfur components. As the active oxygen generating agent retains sulfur components, the particulate removing function of the agent degrades.

The exhaust gas purification mechanism of a particulate filter (hereinafter, simply referred to as "filter") in accordance with the invention and, more particularly, the filter's function of purifying particulate matter from exhaust gas will be explained below. Explanation will be given with reference to an example shown in FIGS. 9A and 9B in which platinum (Pt) is used as a rare metal catalyst and potassium (K) is used as an active oxygen generating agent. The particulate matter removing function will be similarly accomplished by using other rare metals, other alkali metals, alkaline earth metals, rare earths, or transition metals.

Figure 9A:
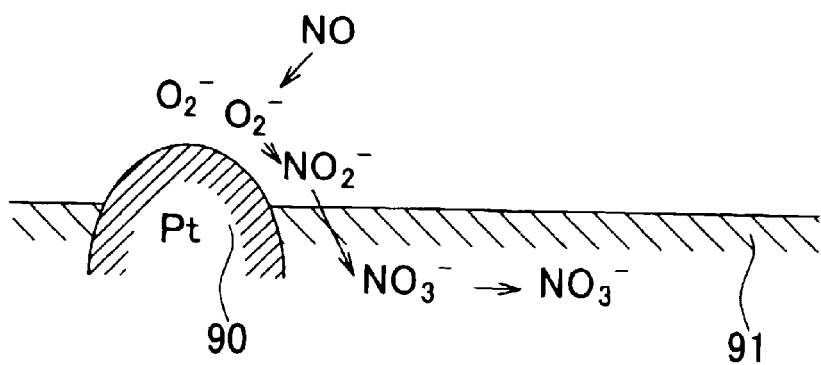
FIG. 9A is an enlarged schematic diagram of a surface of a support layer formed on surfaces of a partition wall of a filter and pore surfaces of the partition walls, for illustration of the particulate removing function.
Figure 9B:
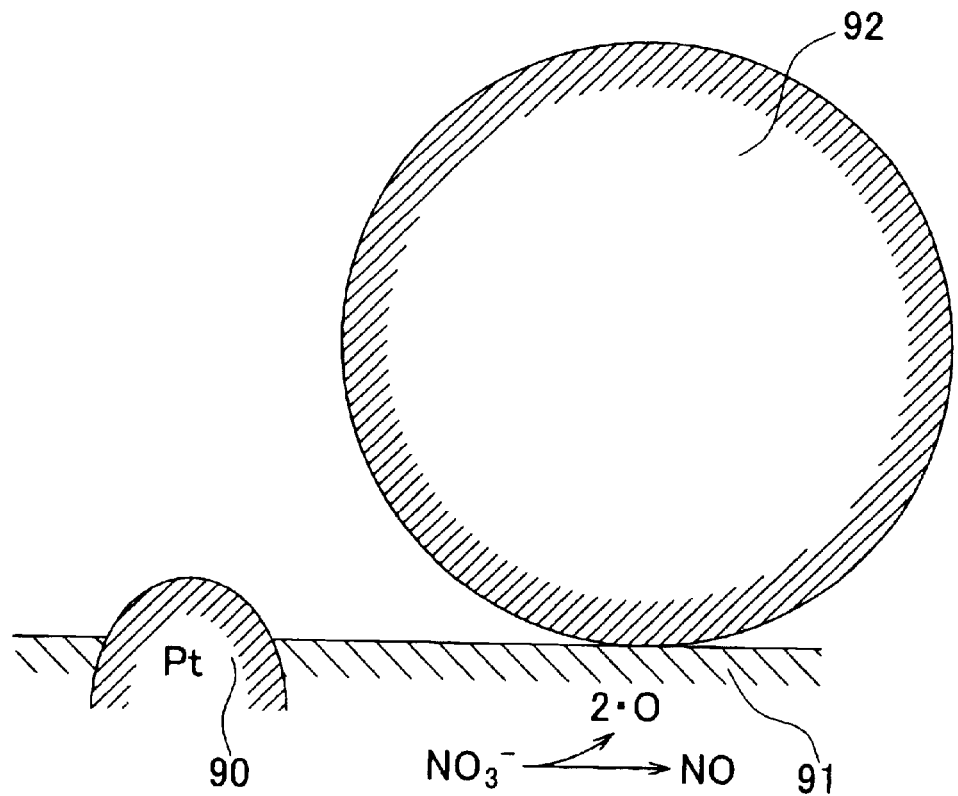
FIG. 9B is a diagram illustrating a state where a small particle is attached to a surface of the support layer shown in FIG. 9A.

FIGS. 9A and 9B are enlarged schematic illustrations of a surface of a support layer formed on the surfaces of partition walls of the filter and the surfaces of pores of the partition walls. In FIGS. 9A and 9B, reference numeral 90 represents a particle of platinum, and 91 represents the support layer that contains an active oxygen generating agent such as potassium or the like.

In this explanation, the ratio between air and fuel supplied into an intake passage and a combustion chamber 5 will be referred to as "air-fuel ratio of exhaust gas". When the air-fuel ratio of exhaust gas flowing into the filter is lean of stoichiometry, generation of NOx, in particular, NO and $NO_2$, occurs in the combustion chamber 5, so that exhaust gas contains NOx. As a result, the filter receives exhaust gas containing NOx and excess oxygen.

As the exhaust gas flows into the filter, oxygen from exhaust gas attaches to surfaces of platinum in the form of $O_2^-$ or $O^{2-}$ as indicated in FIGS. 9A and 9B. NO from exhaust gas reacts with $O_2^-$ or $O^{2-}$ on the surfaces of platinum to produce $NO_2$ ($2NO+O_2 \rightarrow 2NO_2$). A portion of the thus-produced $NO_2$ and the $NO_2$ present in exhaust gas is oxidized on the surfaces of platinum, and is absorbed by the active oxygen generating agent 91, and diffuses in the form of nitrate ions ($NO_3^-$) in the active oxygen generating agent 91 as indicated in FIGS. 9A and 9B while binding to potassium (K) to produce a nitrate salt ($KNO_3$). That is, oxygen from exhaust gas is retained by the active oxygen generating agent 91 in the form of nitrate ions.

In the combustion chamber, small particles formed mainly of carbon (C) are produced. Therefore, exhaust gas contains such small particles. While the exhaust gas flows in the filter, small particles in the exhaust gas contact and attach to surfaces of the active oxygen generating agent 91 as indicated in FIG. 9B.

If a small particle 92 attaches to the active oxygen generating agent 91, an oxygen concentration difference occurs between the surface of the active oxygen generating agent 91 and an interior thereof. Within the active oxygen generating agent 91, oxygen is stored in the form of nitrate ions, and the stored oxygen (nitrate ions) tends to move to the contact surface between the active oxygen generating agent 91 and the small particle 92. As a result, the nitrate salt ($KNO_3$) present in the active oxygen generating agent 91 decomposes into K, O and NO. Then, the thus-produced oxygen (O) moves toward the contact surface between the small particle 92 and the active oxygen generating agent 91 while the NO is released out of the active oxygen generating agent 91. The thus-released NO is oxidized on a downstream-side platinum surface, and is retained in the form of nitrate ions by the active oxygen generating agent 91, by the above-explained mechanism.

The oxygen (O) moving toward the contact surface between the small particle 92 and the active oxygen generating agent 91 originates from the decomposition of a compound, such as a nitrate salt ($KNO_3$), and therefore has unpaired electrons. That is, the oxygen (O) moving toward the contact surface is an active oxygen having very high reactivity. As the active oxygen contacts the small particle 92, the small particle 92 oxidizes without forming a flame and completely disappears within a short time (several seconds to several tens of minutes). Thus, small particles 92 are oxidized and removed, and substantially no deposit of small particles 92 forms on the filter.

In this specification, the term "retain" includes the meanings of "absorb" and "adsorb". Therefore, the "NOx retainer agent" includes a NOx absorbent and a NOx adsorbent. For example, a NOx absorbent stores NOx in the form of a nitrate salt or the like, and a NOx adsorbent adsorbs NOx in the form of $NO_2$ or the like. Furthermore, the term "release" from the NOx retainer agent includes the meaning of "desorb" corresponding to "adsorb" as well as the meaning of "release" corresponding to "absorb".

In conjunction with the foregoing embodiments, it is indicated above that when NOx or sulfur components are to be released from the NOx retainer agent or the sulfur component retainer agent, the air-fuel ratio of incoming exhaust gas is set substantially stoichiometric or rich of stoichiometry. In reality, however, release of NOx or sulfur components is facilitated as the oxygen concentration in incoming exhaust gas becomes below a predetermined oxygen concentration. The predetermined oxygen concentration is an oxygen concentration in exhaust gas that occurs when the air-fuel ratio of the exhaust gas is substantially stoichiometric. Therefore, the description of "the air-fuel ratio of incoming exhaust gas is set substantially stoichiometric or rich of stoichiometry" in conjunction with the foregoing embodiments means that the oxygen concentration in incoming exhaust gas is set at or below the predetermined oxygen concentration. Hence, any type of a reducing agent can be supplied from a fuel supply device into exhaust gas as long as the agent achieves a decreased oxygen concentration and reduces NOx released from the NOx retainer agent.

According to the invention, the air-fuel ratio of exhaust gas flowing into a sulfur component retainer agent is prohibited from being set substantially stoichiometric or rich of stoichiometry if a substantially stoichiometric or rich air-fuel ratio of exhaust gas flowing into the sulfur component retainer agent would increase the amount of sulfur components contained in exhaust gas flowing out of the sulfur component retainer agent. As a result, the amount of sulfur components going out of the sulfur component retainer agent can be minimized even if the amount of sulfur components retained by the sulfur component retainer agent becomes great.

Furthermore, according to the invention, the air-fuel ratio of exhaust gas flowing into a sulfur component retainer agent is prohibited from being set substantially stoichiometric or rich of stoichiometry if a substantially stoichiometric or rich air-fuel ratio of exhaust gas flowing into the sulfur component retainer agent would increase the amount of sulfur components going out of the sulfur component retainer agent by at least a predetermined amount of increase. As a result, the outflow of sulfur components from the sulfur component retainer agent can be minimized even if the amount of sulfur components retained by the sulfur component retainer agent becomes great.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An exhaust emission control apparatus for an internal combustion engine, comprising:

an exhaust passage;

a NOx retainer agent that is provided in the exhaust passage, and that takes up and retains NOx from an incoming exhaust gas if an air-fuel ratio of the incoming exhaust gas is lean of stoichiometry, and that releases NOx retained by the NOx retainer agent if the air-fuel ratio of the incoming exhaust gas is substantially stoichiometric or rich of stoichiometry;

a sulfur component retainer agent that is provided in the exhaust passage upstream of the NOx retainer agent, and that takes up and retains a sulfur component contained in the incoming exhaust gas; and when the air-fuel ratio of the exhaust gas flowing into the sulfur component retainer agent is substantially stoichiometric or rich of stoichiometry, a controller performs a NOx releasing process of adjusting the air-fuel ratio of an exhaust gas flowing into the sulfur component retainer agent so that the air-fuel ratio of an exhaust gas flowing into the NOx retainer agent becomes substantially stoichiometric or rich of stoichiometry if NOx retained by the NOx retainer agent is to be released, and prohibits the air-fuel ratio of the exhaust gas flowing into the sulfur component retainer agent from becoming substantially stoichiometric or rich of stoichiometry if an amount of the sulfur component retained by the sulfur component retainer agent is at least a first predetermined amount.

2. The exhaust emission control apparatus according to claim 1,
wherein the exhaust passage is provided with a bypass passage that causes an exhaust gas to bypass the NOx retainer agent, and a flow regulator valve that controls an amount of flow of the exhaust gas flowing into the bypass passage, and
wherein if the amount of the sulfur component retained by the sulfur component retainer agent is at least a second predetermined amount and it is possible to release the sulfur component from the sulfur component retainer agent, the controller causes a predetermined condition for releasing the sulfur component to be fulfilled so as to release the sulfur component from the sulfur component retainer agent, and causes at least a most portion of the exhaust gas to flow into the bypass passage by controlling the flow regulator valve.

3. The exhaust emission control apparatus according to claim 2, wherein the predetermined condition for releasing the sulfur component is a condition that the air-fuel ratio of the exhaust gas be substantially stoichiometric or rich of stoichiometry and a temperature of the sulfur component retainer agent be at least a sulfur component release temperature.

4. The exhaust emission control apparatus according to claim 2, wherein when it is possible to release the sulfur component from the sulfur component retainer agent when it is possible to easily fulfill the condition for releasing the sulfur component.

5. The exhaust emission control apparatus according to claim 2, wherein the first predetermined amount and the second predetermined amount are equal.

6. The exhaust emission control apparatus according to claim 1,
wherein the exhaust passage is provided with an annular passage that branches from a branching portion of the exhaust passage and returns to the branching portion and that has the NOx retainer agent in an intermediate portion of the annular passage, and a flow regulator valve that controls an amount of flow of an exhaust gas into the annular passage and a direction of flow of the exhaust gas into the annular passage, and
wherein if the amount of the sulfur component retained by the sulfur component retainer agent is at least a second predetermined amount and it is possible to release the sulfur component from the sulfur component retainer agent, the controller causes a predetermined condition for releasing the sulfur component to be fulfilled so as to release the sulfur component from the sulfur component retainer agent, and causes at least a most portion of the exhaust gas to flow downstream of the branching portion without flowing into the annular passage by controlling the flow regulator valve.

7. The exhaust emission control apparatus according to claim 6, wherein the predetermined condition for releasing the sulfur component is a condition that the air-fuel ratio of the exhaust gas be substantially stoichiometric or rich of stoichiometry and a temperature of the sulfur component retainer agent be at least a sulfur component release temperature.

8. The exhaust emission control apparatus according to claim 6, wherein when it is possible to release the sulfur component from the sulfur component retainer agent when it is possible to easily fulfill the condition for releasing the sulfur component.

9. The exhaust emission control apparatus according to claim 6, wherein the first predetermined amount and the second predetermined amount are equal.

10. The exhaust emission control apparatus according to claim 1, wherein the first predetermined amount and the second predetermined amount are calculated from a temperature of the sulfur component retainer agent.

11. The exhaust emission control apparatus according to claim 1, wherein the first predetermined amount and the second predetermined amount are calculated from a temperature of the sulfur component retainer agent and the air-fuel ratio of the exhaust gas flowing into the sulfur component retainer agent.

12. The exhaust emission control apparatus according to claim 1, further comprising a fuel supply device that is disposed in the exhaust passage upstream of the sulfur component retainer agent and that supplies a fuel into the exhaust gas flowing into the sulfur component retainer agent if the NOx releasing process is to be performed.

13. The exhaust emission control apparatus according to claim 1, wherein the NOx retainer agent is supported on a particulate filter that traps a particulate substance contained in the incoming exhaust gas.

14. An exhaust emission control apparatus for an internal combustion engine, comprising:
an exhaust passage;
a NOx retainer agent that is provided in the exhaust passage, and that takes up and retains NOx from an incoming exhaust gas if an air-fuel ratio of the incoming exhaust gas is lean of stoichiometry, and that releases NOx retained by the NOx retainer agent if the air-fuel ratio of the incoming exhaust gas is substantially stoichiometric or rich of stoichiometry;
a sulfur component retainer agent which is provided in the exhaust passage upstream of the NOx retainer agent for taking up and retaining a sulfur component contained in the incoming exhaust gas, and an outflow of the sulfur component from which increases with an increase in an amount of the sulfur component retained by the sulfur component retainer agent if the air-fuel ratio of the incoming exhaust gas is substantially stoichiometric or rich of stoichiometry; and
when the air-fuel ratio of the exhaust gas flowing into the sulfur component retainer agent is substantially stoichiometric or rich of stoichiometry, a controller prohibits the air-fuel ratio of the exhaust gas flowing into the sulfur component retainer agent from becoming substantially stoichiometric or rich of stoichiometry if the outflow of the sulfur component from the sulfur component retainer agent is to be kept less than a predetermined amount.

15. An exhaust emission control method for an internal combustion engine, comprising:
causing an exhaust gas to flow into an exhaust passage;
causing a sulfur component retainer agent provided in the exhaust passage to capture and retain a sulfur component contained in an incoming exhaust gas;
causing a NOx retainer agent provided in the exhaust passage downstream of the sulfur component retainer agent to capture and retain NOx from the incoming exhaust gas if an air-fuel ratio of the incoming exhaust gas is lean of stoichiometry, and causing the NOx retainer agent to release NOx retained by the NOx retainer agent if the air-fuel ratio of the incoming exhaust gas is substantially stoichiometric or rich of stoichiometry;

performing a NOx releasing process of adjusting the air-fuel ratio of an exhaust gas flowing into the NOx retainer agent so that the air-fuel ratio of the exhaust gas becomes substantially stoichiometric or rich of stoichiometry if NOx retained by the NOx retainer agent is to be released; and prohibiting the air-fuel ratio of an exhaust gas flowing into the sulfur component retainer agent from becoming substantially stoichiometric or rich of stoichiometry if an amount of the sulfur component retained by the sulfur component retainer agent is at least a first predetermined amount when the air-fuel ratio of the exhaust gas flowing into the sulfur component retainer agent is substantially stoichiometric or rich of stoichiometry.

16. The exhaust emission control method according to claim 15, wherein if the amount of the sulfur component retained by the sulfur component retainer agent is at least a second predetermined amount and it is possible to release the sulfur component from the sulfur component retainer agent, a predetermined condition for releasing the sulfur component is caused to be fulfilled, and at least a most portion of the exhaust gas is caused to flow into a bypass passage provided for avoiding inflow of the exhaust gas into the NOx retainer agent.

17. The exhaust emission control method according to claim 16, wherein the predetermined condition for releasing the sulfur component is a condition that the air-fuel ratio of the exhaust gas be substantially stoichiometric or rich of stoichiometry and a temperature of the sulfur component retainer agent be at least a sulfur component release temperature.

18. The exhaust emission control method according to claim 16, wherein when it is possible to release the sulfur component from the sulfur component retainer agent when it is possible to easily fulfill the condition for releasing the sulfur component.

19. The exhaust emission control method according to claim 16, wherein the first predetermined amount and the second predetermined amount are equal.

20. The exhaust emission control method according to claim 15, wherein if the amount of the sulfur component retained by the sulfur component retainer agent is at least a second predetermined amount and it is possible to release the sulfur component from the sulfur component retainer agent, a predetermined condition for releasing the sulfur component is caused to be fulfilled, and at least a most portion of the exhaust gas is caused to flow downstream of a branching portion of the exhaust passage without flowing into an annular passage that branches from the branching portion of the exhaust passage and returns to the branching portion and that has the NOx retainer agent in an intermediate portion of the annular passage.

21. The exhaust emission control method according to claim 20, wherein the predetermined condition for releasing the sulfur component is a condition that the air-fuel ratio of the exhaust gas be substantially stoichiometric or rich of stoichiometry and a temperature of the sulfur component retainer agent be at least a sulfur component release temperature.

22. The exhaust emission control method according to claim 20, wherein when it is possible to release the sulfur component from the sulfur component retainer agent when it is possible to easily fulfill the condition for releasing the sulfur component.

23. The exhaust emission control method according to claim 20, wherein the first predetermined amount and the second predetermined amount are equal.

24. The exhaust emission control method according to claim 15, wherein the first predetermined amount and the second predetermined amount are calculated from a temperature of the sulfur component retainer agent.

25. The exhaust emission control method according to claim 15, wherein the first predetermined amount and the second predetermined amount are calculated from a temperature of the sulfur component retainer agent and the air-fuel ratio of the exhaust gas flowing into the sulfur component retainer agent.

26. The exhaust emission control method according to claim 15, wherein a fuel is supplied into the exhaust gas flowing into the exhaust passage upstream of the sulfur component retainer agent if the NOx releasing process is to be performed.

27. An exhaust emission control method for an internal combustion engine, comprising:

causing an exhaust gas to flow into an exhaust passage;

causing a sulfur component retainer agent provided in the exhaust passage to capture and retain a sulfur component contained in an incoming exhaust gas;

causing a NOx retainer agent provided in the exhaust passage downstream of the sulfur component retainer agent to capture and retain NOx from the incoming exhaust gas if an air-fuel ratio of the incoming exhaust gas is lean of stoichiometry, and causing the NOx retainer agent to release NOx retained by the NOx retainer agent if the air-fuel ratio of the incoming exhaust gas is substantially stoichiometric or rich of stoichiometry;

performing a NOx releasing process of adjusting the air-fuel ratio of an exhaust gas flowing into the NOx retainer agent so that the air-fuel ratio of the exhaust gas becomes substantially stoichiometric or rich of stoichiometry if NOx retained by the NOx retainer agent is to be released; and prohibiting the air-fuel ratio of the exhaust gas flowing into the sulfur component retainer agent from becoming substantially stoichiometric or rich of stoichiometry if an amount of the sulfur component retained by the sulfur component retainer agent is to be kept less than a predetermined amount when the air-fuel ratio of the exhaust gas flowing into the sulfur component retainer agent is substantially stoichiometric or rich of stoichiometry.

28. The exhaust emission control apparatus according to claim 1, wherein during a process of releasing NOx, the controller performs the NOx releasing process and prohibits the air-fuel ratio of the exhaust gas flowing into the sulfur component retainer agent from becoming substantially stoichiometric or rich of stoichiometry if an amount of the sulfur component retained by the sulfur component retainer agent is at least a first predetermined amount.

29. The exhaust emission control method according to claim 15, wherein the prohibiting the air-fuel ratio of an exhaust gas flowing into the sulfur component retainer agent from becoming substantially stoichiometric or rich of stoichiometry if an amount of the sulfur component retained by the sulfur component retainer agent is at least a first predetermined amount occurs during the NOx releasing process.

* * * * *